(12) United States Patent
Kojima et al.

(10) Patent No.: US 9,234,684 B2
(45) Date of Patent: Jan. 12, 2016

(54) REFRIGERANT PASSAGE CHANGE-OVER VALVE AND AIR CONDITIONER USING THE SAME

(75) Inventors: Makoto Kojima, Osaka (JP); Noriyuki Okuda, Osaka (JP); Takayuki Setoguchi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/129,843

(22) PCT Filed: Jun. 20, 2012

(86) PCT No.: PCT/JP2012/004010
§ 371 (c)(1),
(2), (4) Date: Dec. 27, 2013

(87) PCT Pub. No.: WO2013/001751
PCT Pub. Date: Jan. 3, 2013

(65) Prior Publication Data
US 2014/0311179 A1 Oct. 23, 2014

(30) Foreign Application Priority Data
Jun. 30, 2011 (JP) ................................. 2011-146121

(51) Int. Cl.
*F25B 41/04* (2006.01)
*F16K 11/074* (2006.01)
*F16K 11/16* (2006.01)

(52) U.S. Cl.
CPC ............. *F25B 41/04* (2013.01); *F16K 11/0746* (2013.01); *F16K 11/166* (2013.01); *F25B 41/046* (2013.01); *Y10T 137/86485* (2015.04)

(58) Field of Classification Search
CPC ...... F25B 41/046; F25B 41/04; F16K 11/074; F16K 11/0743; F16K 11/0746; F16K 11/076; F16K 11/166; Y10T 137/86485; Y10T 137/776; Y10T 137/2678; Y10T 137/86839
USPC ................................. 137/487, 119.02, 625.43
See application file for complete search history.

(56) References Cited

U.S. PATENT DOCUMENTS

| | | | | |
|---|---|---|---|---|
| 2,609,831 A | * | 9/1952 | MacGeorge | .................. 137/487 |
| 4,393,893 A | * | 7/1983 | Alexander | ............... 137/246.12 |
| 4,450,854 A | * | 5/1984 | Alexander et al. | ........ 137/246.12 |
| 4,545,401 A | * | 10/1985 | Karpis | .......................... 137/487 |
| 5,143,116 A | * | 9/1992 | Skoglund | ...................... 137/487 |
| 5,462,085 A | * | 10/1995 | Iwata et al. | ............. 137/625.43 |
| 5,488,969 A | * | 2/1996 | King et al. | ........................ 137/8 |
| 5,732,739 A | * | 3/1998 | Ota | .......................... 137/625.46 |

(Continued)

FOREIGN PATENT DOCUMENTS

| CN | 101305224 A | 11/2008 |
|---|---|---|
| JP | 2001-098958 A | 4/2001 |

(Continued)

*Primary Examiner* — William McCalister
(74) *Attorney, Agent, or Firm* — Birch, Stewart, Kolasch & Birch, LLP

(57) ABSTRACT

A valve case (11) includes a plurality of ports (P1, P2, P3, . . . ). A valve body (50) rotates in the valve case (11) and slide on openings of predetermined ones of the ports (P1, P2, P3, . . . ) to switch a communication state among the ports (P1, P2, P3, . . . ). A motor (31) rotates the valve body (50). A controller (500) controls a rotation speed ($\omega$) of the motor (31) in accordance with a differential pressure ($\Delta P$) between internal and external pressures of the valve body (50).

8 Claims, 16 Drawing Sheets

(56) References Cited

U.S. PATENT DOCUMENTS

| | | | |
|---|---|---|---|
| 5,787,929 A * | 8/1998 | Iwata | 137/625.43 |
| 5,885,062 A * | 3/1999 | Inoue et al. | 417/280 |
| 5,988,219 A * | 11/1999 | Larsen | 137/625.43 |
| 6,076,365 A * | 6/2000 | Benatav | 62/160 |
| 6,234,207 B1 * | 5/2001 | Toyama | 137/625.43 |
| 6,491,063 B1 * | 12/2002 | Benatav | 137/625.43 |
| 6,684,651 B1 * | 2/2004 | Yoshizawa et al. | 62/160 |
| 6,823,897 B2 * | 11/2004 | Hirota et al. | 137/885 |
| 7,128,086 B2 * | 10/2006 | Kirchner et al. | 137/501 |
| 2001/0013369 A1 * | 8/2001 | Sasada et al. | 137/625.43 |
| 2006/0230770 A1 * | 10/2006 | Kitsch | 62/151 |
| 2007/0101709 A1 * | 5/2007 | Cronin | 60/445 |
| 2008/0185050 A1 * | 8/2008 | Mulligan et al. | 137/487 |

FOREIGN PATENT DOCUMENTS

| | | |
|---|---|---|
| JP | 2001-295951 A | 10/2001 |
| JP | 2002-005543 A | 1/2002 |
| JP | 2003-314715 A | 11/2003 |
| JP | 2011-075016 A | 4/2011 |

* cited by examiner

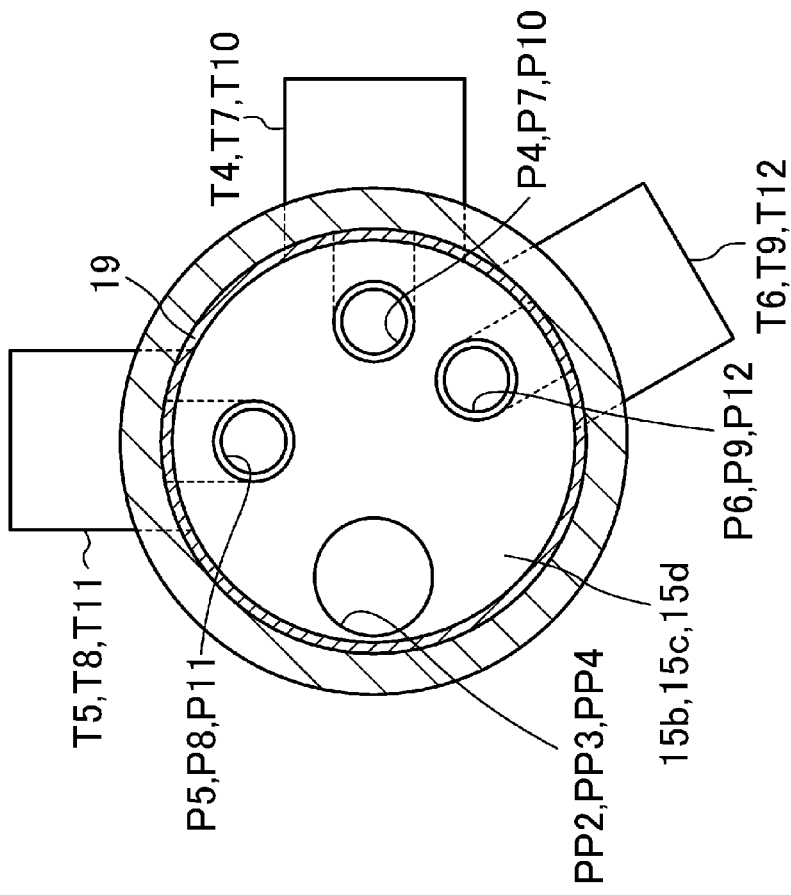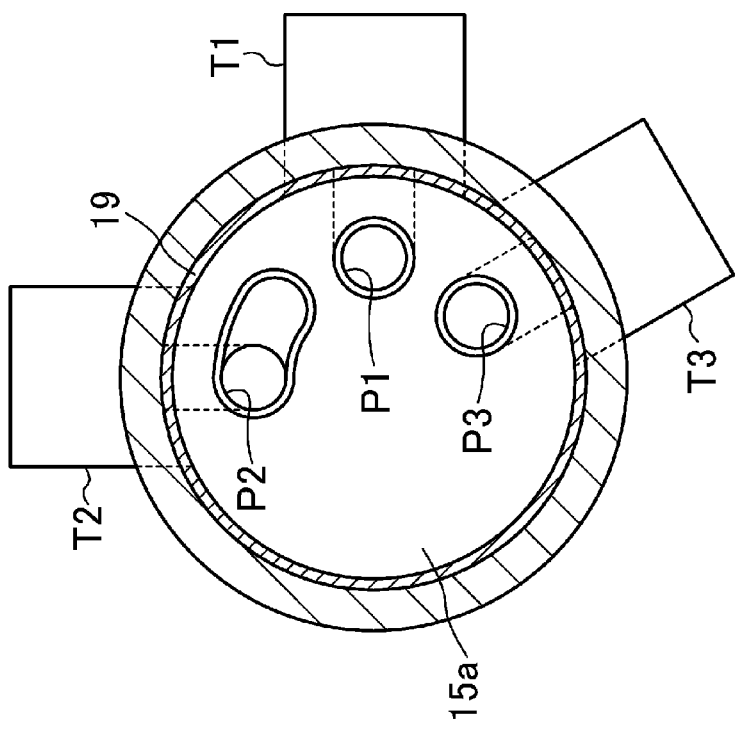

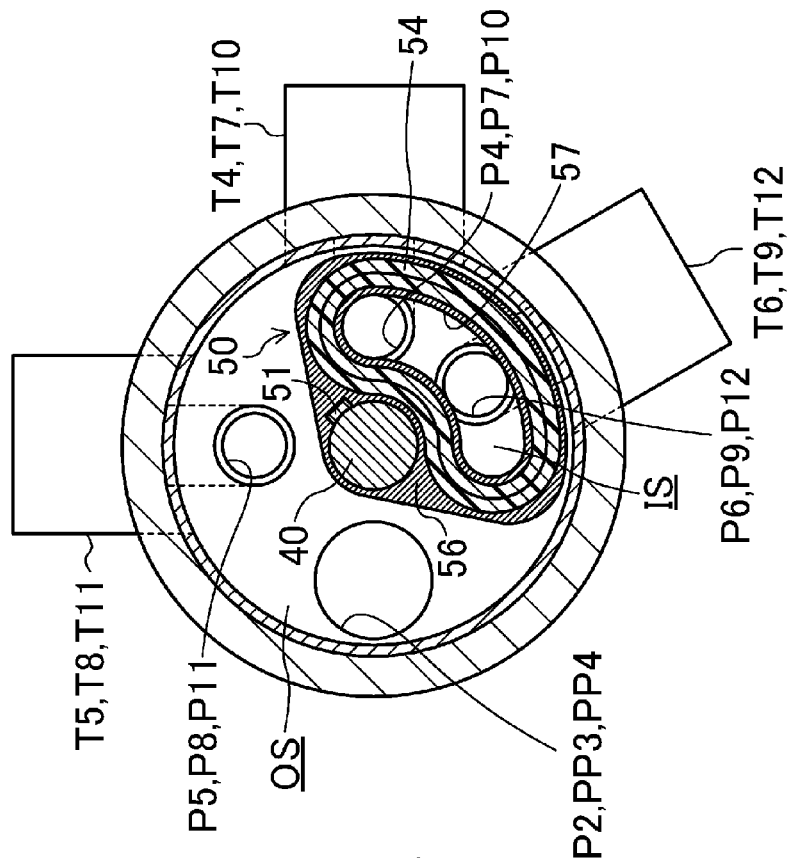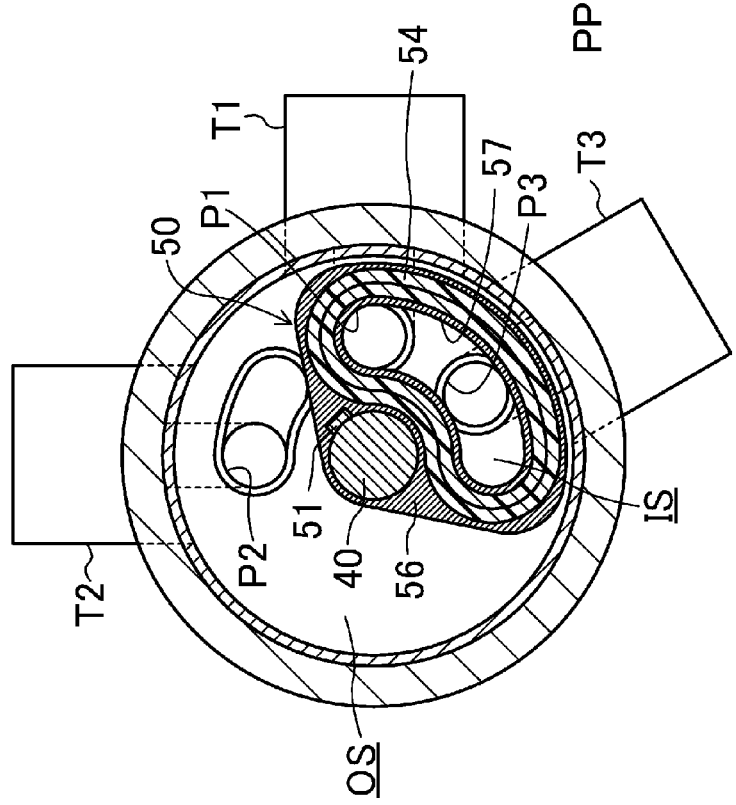

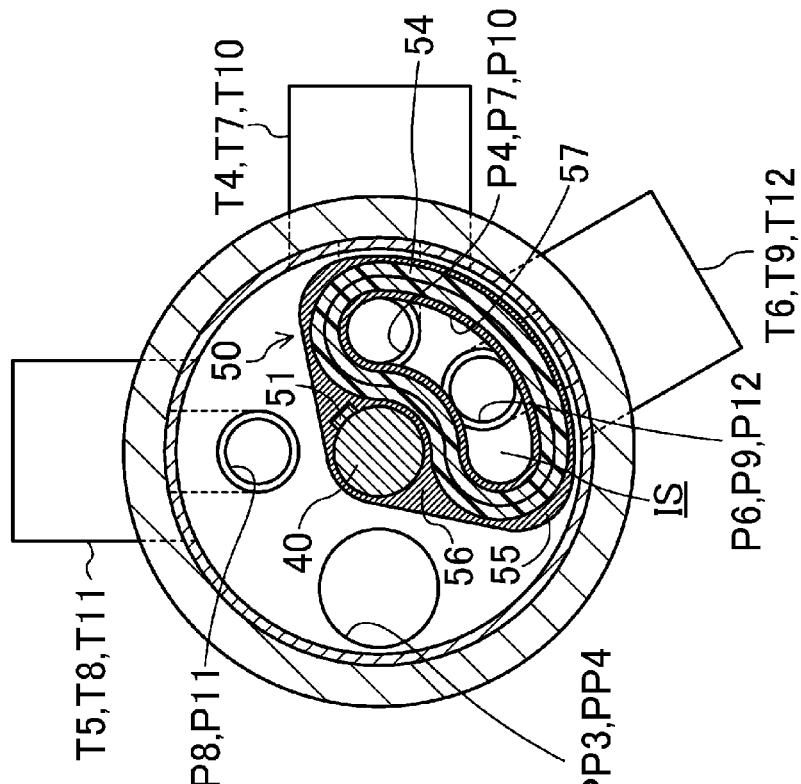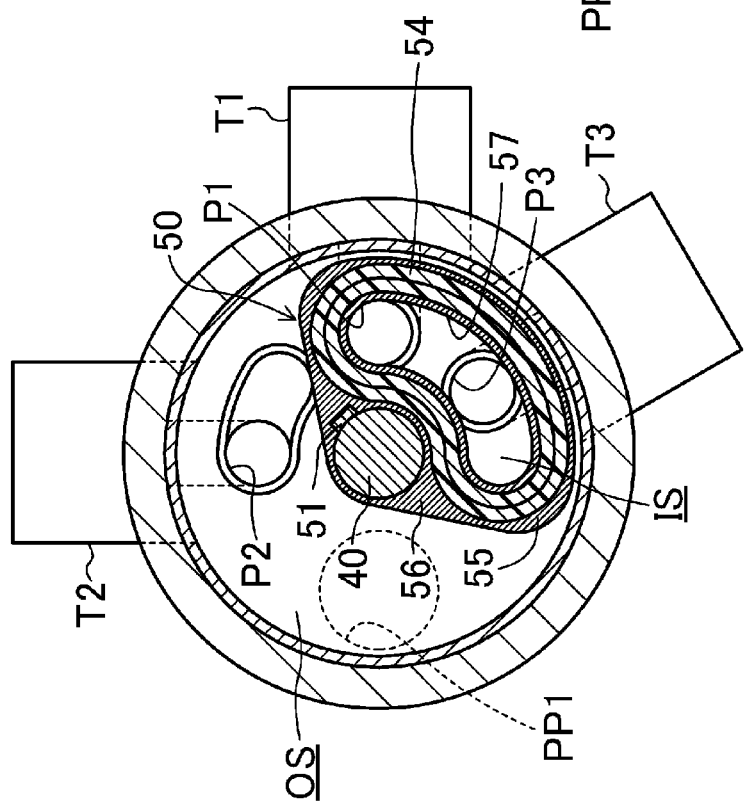

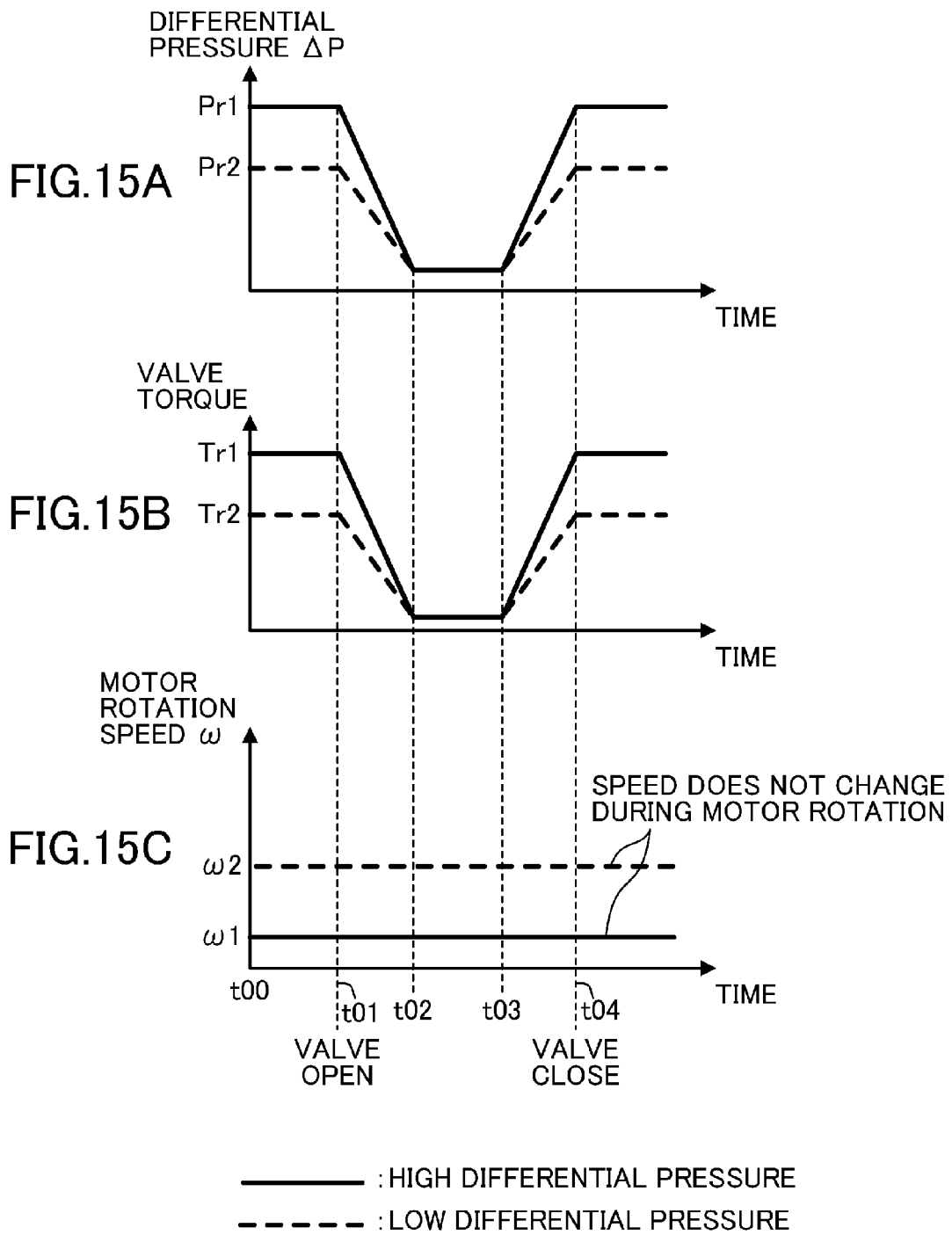

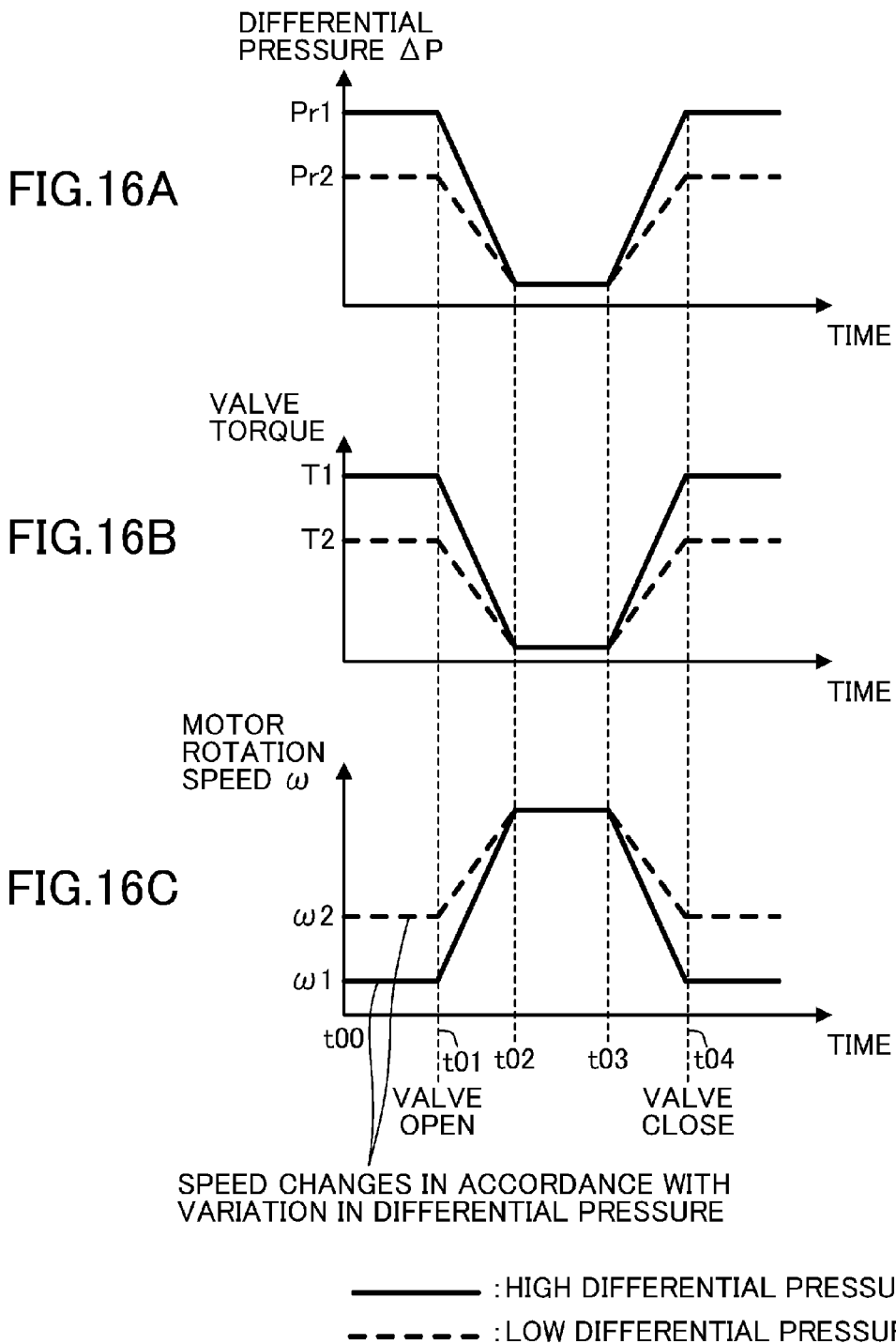

REFRIGERANT PASSAGE CHANGE-OVER VALVE AND AIR CONDITIONER USING THE SAME

TECHNICAL FIELD

The present invention relates to refrigerant passage change-over valves for switching passages of, for example, refrigerant in refrigerant circuits and also to air conditioners using such refrigerant passage change-over valves.

BACKGROUND ART

Many refrigerant circuits in, for example, air conditioners use refrigerant passage change-over valves for switching passages of refrigerant in order to switch operation between cooling and heating, for example. One of such refrigerant passage change-over valves is used to control a communication state among ports in a hermetic case by rotating a movable valve body rotatably attached to a hermetic case by a motor to switch the positional relationship among the ports and grooves formed on the movable valve body (see, for example, Patent Document 1).

CITATION LIST

Patent Document
 [Patent Document 1] Japanese Unexamined Patent Publication No. 2011-075016

SUMMARY OF THE INVENTION

Technical Problem

In the refrigerant passage change-over valve as described in Patent Document 1, predetermined ports communicate with each other in the space of the case. Thus, the differential pressure between the pressure in the movable valve body and the pressure in the case is applied to the movable valve body, and the movable valve body needs to rotate against the differential pressure when switching the passage. The motor for driving the movable valve body needs to generate a maximum torque when the highest actuation differential pressure is applied to this movable valve body. A torque generated by a motor generally depends on the rotation speed. In view of this, in the refrigerant passage change-over valve as described in Patent Document 1, it may be advantageous to adjust the rotation speed of the motor in accordance with the highest actuation differential pressure.

However, a torque generated by a motor decreases as the rotation speed increases in general. Thus, if the drive revolution speed is determined in accordance with the highest actuation differential pressure, the rotation speed is set relatively low, and thus, the time necessary for switching the passage might increase. Simply increasing the rotation speed of the motor in order to shorten the switching period might lose synchronization of the motor when the differential pressure is high.

It is therefore an object of the present invention to reduce a switching period in a refrigerant passage change-over valve that is driven under rotation of a motor.

Solution to the Problem

To achieve the object, in a first aspect of the present invention, a refrigerant passage change-over valve configured to switch a refrigerant passage in a refrigerant circuit (61) includes: a valve case (11) including a plurality of ports (P1, P2, P3, . . . ); a valve body (50) configured to rotate in the valve case (11) and slide on openings of predetermined ones of the ports (P1, P2, P3, . . . ) to switch a communication state among the ports (P1, P2, P3, . . . ); a motor (31) configured to rotate the valve body (50); and a controller (500) configured to control a rotation speed ($\omega$) of the motor (31) in accordance with a differential pressure ($\Delta P$) between internal and external pressures of the valve body (50).

In this configuration, the rotation speed of the motor (31) is determined in accordance with the differential pressure ($\Delta P$) between the internal and external pressures of the valve body (50), thereby enabling the motor (31) to rotate at higher speed.

In a second aspect of the present invention, in the refrigerant passage change-over valve of the first aspect, the controller (500) sets the rotation speed ($\omega$) at a start of switching of the valve body (50) in accordance with the differential pressure ($\Delta P$).

In this configuration, the rotation speed of the motor (31) is set at a higher speed at the start of switching.

In a third aspect of the present invention, in the refrigerant passage change-over valve of the first or second aspect, the rotation speed ($\omega$) of the motor (31) is controlled to be constant by the controller (500) during switching operation of the valve body (50).

In this configuration, the rotation speed of the motor (31) is constant during switching of the valve body (50).

In a fourth aspect of the present invention, in the refrigerant passage change-over valve of the first or second aspect, during switching operation of the valve body (50), the controller (500) reduces the rotation speed ($\omega$) in accordance with an increase in the differential pressure ($\Delta P$) and increases the rotation speed ($\omega$) in accordance with a decrease in the differential pressure ($\Delta P$).

In this configuration, the rotation speed of the motor (31) is controlled in accordance with the differential pressure ($\Delta P$) during switching of the valve body (50).

In a fifth aspect of the present invention, in the refrigerant passage change-over valve of any one of the first through fourth aspects, the valve body (50) includes a plurality of valve bodies (50), the valve case (11) is partitioned into a plurality of valve chambers (17a, 17b, 17c, 17d) each housing an associated one of the valve bodies (50), and the valve bodies (50) are connected to a common drive shaft (40) that is driven by the motor (31).

This configuration enables the motor (31) for a combined valve requiring a larger torque to be set at a higher rotation speed.

In a sixth aspect of the present invention, an air conditioner includes a refrigerant circuit (61) including the refrigerant passage change-over valve (10) of any one of the first through fifth aspects to perform a refrigeration cycle.

Advantages of the Invention

In the first aspect, the motor (31) can be set at a higher rotation speed, thereby enabling reduction of a switching period. In addition, since it is possible to select an optimum rotation speed, the gear ratio of a variable-speed gear can be reduced in a configuration in which the motor (31) drives the valve body (50) via the variable-speed gear, for example. Further, the size of the motor (31) can be reduced. That is, the cost of the refrigerant passage change-over valve can be reduced.

In the second aspect, the rotation speed of the motor (31) at a start of switching is set at a higher speed, thereby enabling reduction of a switching period.

In the third aspect, the motor (31) can be easily controlled.

In the fourth aspect, the rotation speed of the motor (31) is controlled in accordance with a variation of the differential pressure ($\Delta P$), and thus, the revolution speed of the motor (31) can be set a higher speed.

In the fifth aspect, in a combined valve requiring a larger torque for driving, a switching period can be reduced.

BRIEF DESCRIPTION OF THE DRAWINGS

FIGS. 3A and 3B are transverse cross-sectional views illustrating the combined valve of the first embodiment, FIG. 3A illustrates an A-A section of FIG. 2 without a valve body, and FIG. 3B illustrates a B-B section of FIG. 2 without a valve body.

FIGS. 4A and 4B are transverse cross-sectional views illustrating the combined valve of the first embodiment, FIG. 4A is the A-A section of FIG. 2 with a valve body, and FIG. 4B illustrates the B-B section of FIG. 2 with a valve body.

FIG. 7A illustrates a first passage switch, and FIG. 7B illustrates second through fourth passage switches.

FIGS. 8A and 8B are transverse cross-sectional views of the combined valve when the valve body is at a second position, FIG. 8A illustrates the first passage switch, and FIG. 8B illustrates the second through fourth passage switches.

FIGS. 15A-15C are timing charts showing relationships among a differential pressure, a valve torque, and a rotation speed of a motor in the combined valve of the first embodiment.

FIGS. 16A-16C are timing charts showing relationships among a differential pressure, a valve torque, and a rotation speed of a motor in a combined valve according to a second embodiment.

DESCRIPTION OF EMBODIMENTS

Embodiments of the present invention will be described in detail with reference to the drawings. The following embodiments are merely preferred examples in nature, and are not intended to limit the scope, applications, and use of the invention.

First Embodiment

<Structure of Combined Valve>

Figure 1:
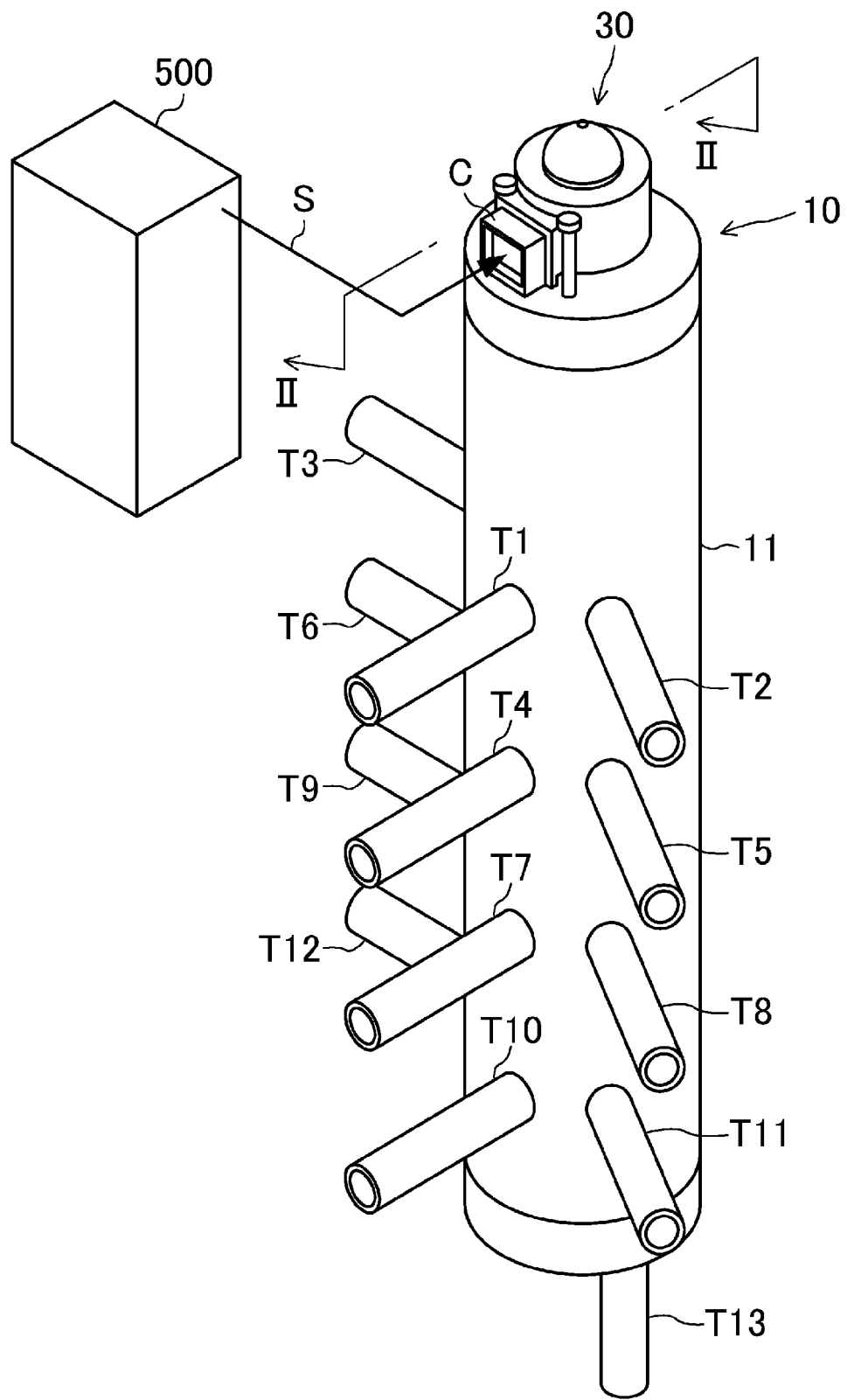
FIG. 1 is a full view of a combined valve according to a first embodiment.
Figure 2:
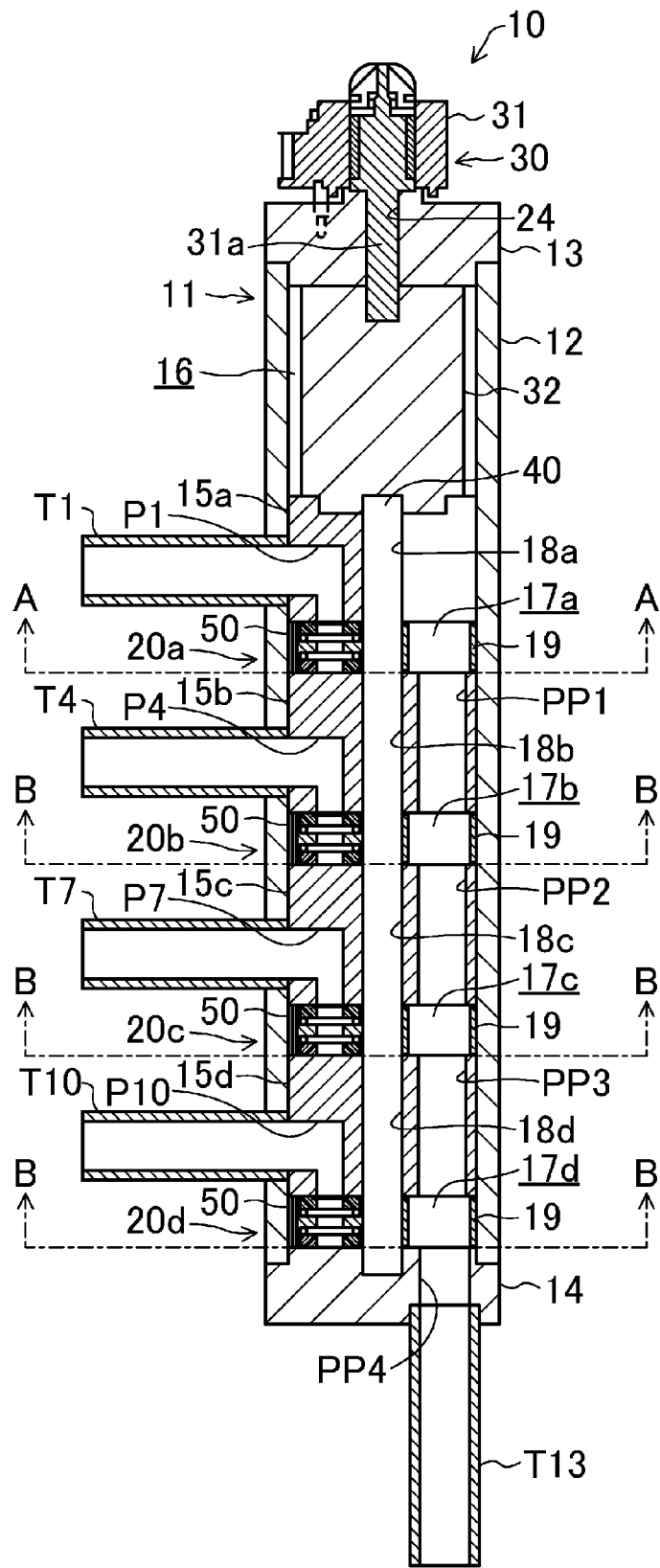
FIG. 2 is a longitudinal cross-sectional view illustrating the combined valve of the first embodiment.

An example combined valve for use in a refrigerant circuit (61) (which will be described later) of an air conditioner will be described as an embodiment of a refrigerant passage change-over valve of the present invention. FIG. 1 is a perspective view illustrating a combined valve (10) of a first embodiment. FIG. 2 is a sectional view of the combined valve (10). As illustrated in FIGS. 1 and 2, the combined valve (10) of this embodiment includes a valve case (11), a drive mechanism (30), and first through fourth passage switches (20a, 20b, 20c, 20d).

<Valve Case>

The valve case (11) includes an approximately cylindrical shell (12), an approximately bottomed-cylindrical upper closer (13) that closes the upper end of the shell (12), and an approximately bottomed-cylindrical lower closer (14) that closes the lower end of the shell (12). In the valve case (11), approximately bottomed-cylindrical first through fourth separators (15a, 15b, 15c, 15d) are axially arranged in this order from the top to the bottom and to be spaced apart from one another. Adjacent ones of the separators (15a, 15b, 15c, 15d) sandwich a ring-shaped spacer (19) along the inner wall of the shell (12). The spacers (19) allow the separators (15a, 15b, 15c, 15d) to be evenly spaced from one another.

Between the upper closer (13) and the first separator (15a), a housing chamber (16) that houses a variable-speed gear (32) of the drive mechanism (30) is formed. The first passage switch (20a) is located between the first separator (15a) and the second separator (15b). The second passage switch (20b) is located between the second separator (15b) and the third separator (15c). The third passage switch (20c) is located between the third separator (15c) and the fourth separator (15d). The fourth passage switch (20d) is located between the fourth separator (15d) and the lower closer (14). The passage switches (20a, 20b, 20c, 20d) include valve chambers (17a, 17b, 17c, 17d) and valve bodies (50) that are housed in the valve chambers (17a, 17b, 17c, 17d) to be freely displaced. The passage switches (20a, 20b, 20c, 20d) will be specifically described later.

The upper closer (13) has a shaft hole (24) axially penetrating the center of the upper closer (13). A rotation shaft (31a) of a stepping motor (31) included in the drive mechanism (30) is slidably fitted in the shaft hole (24).

The first separator (15a) has first through third ports (P1, P2, P3) penetrating the first separator (15a). Each of the ports (P1, P2, P3) has one of its ends open at the lower surface of the first separator (15a) and another end open at a side surface of the first separator (15a). An end of each of the ports (P1, P2, P3) is open to the first valve chamber (17a). As illustrated in FIG. 3A, these openings have circular shapes having an identical diameter in cross section perpendicular to the axis. These openings are disposed on a circumference of a virtual circle about the axial center of a drive shaft (40). Another end of each of the ports (P1, P2, P3) is connected to an associated one of first through third short pipes (T1, T2, T3) penetrating the shell (12).

The second separator (15b) has fourth through sixth ports (P4, P5, P6) penetrating the second separator (15b). Each of the ports (P4, P5, P6) has one of its ends open at the lower surface of the second separator (15b) and another end open at a side surface of the second separator (15b). An end of each of the ports (P4, P5, P6) is open to the second valve chamber (17b). As illustrated in FIG. 3B, these openings have circular shapes having an identical diameter in cross section perpendicular to the axis. These openings are disposed on a circumference of a virtual circle about the axial center of the drive shaft (40). Another end of each of the ports (P4, P5, P6) is connected to an associated one of fourth through sixth short pipe (T4, T5, T6) penetrating the shell (12).

The second separator (15b) also has a first communication port (PP1) axially penetrating the second separator (15b), in addition to the fourth through sixth ports (P4, P5, P6). The opening of the first communication port (PP1) has a circular shape whose diameter is larger than that of the fourth through sixth ports (P4, P5, P6) in cross section perpendicular to the axis. The first communication port (PP1) allows the first valve chamber (17a) and the second valve chamber (17b) to communicate with each other.

The third separator (15c) has seventh through ninth ports (P7, P8, P9) penetrating the third separator (15c). Each of the ports (P7, P8, P9) has one of its ends open at the lower surface of the third separator (15c) and another end open at a side surface of the third separator (15c). An end of each of the ports (P7, P8, P9) is open to the third valve chamber (17c). As illustrated in FIG. 3B, these openings have circular shapes having an identical diameter in cross section perpendicular to the axis. These openings are disposed on a circumference of a virtual circle about the axial center of the drive shaft (40). Another end of each of the ports (P7, P8, P9) is connected to an associated one of seventh through ninth short pipes (T7, T8, T9) penetrating the shell (12).

The third separator (15c) also has a second communication port (PP2) axially penetrating the third separator (15c), in addition to the seventh through ninth ports (P7, P8, P9). The opening of the second communication port (PP2) has a circular shape whose diameter is larger than that of the seventh through ninth ports (P7, P8, P9) in cross section perpendicular to the axis. The second communication port (PP2) allows the second valve chamber (17b) and the third valve chamber (17c) to communicate with each other.

The fourth separator (15d) has tenth through twelfth ports (P10, P11, P12) penetrating the fourth separator (15d). Each of the ports (P10, P11, P12) has one of its ends open at the lower surface of the fourth separator (15d) and another end open at a side surface of the fourth separator (15d). An end of each of the ports (P10, P11, P12) is open to the fourth valve chamber (17d). As illustrated in FIG. 3B, these openings have circular shapes having an identical diameter in cross section perpendicular to the axis. These openings are disposed on a circumference of a virtual circle about the axial center of the drive shaft (40). Another end of each of the ports (P10, P11, P12) is connected to an associated one of tenth through twelfth short pipes (T10, T11, T12) penetrating the shell (12).

The fourth separator (15d) also has a third communication port (PP3) axially penetrating the fourth separator (15d), in addition to the tenth through twelfth ports (P10, P11, P12). The opening of the third communication port (PP3) has a circular shape whose diameter is larger than that of the tenth through twelfth ports (P10, P11, P12) in cross section perpendicular to the axis. The third communication port (PP3) allows the third valve chamber (17c) and the fourth valve chamber (17d) to communicate with each other.

The lower closer (14) has a fourth communication port (PP4) axially penetrating the lower closer (14). The fourth communication port (PP4) has one of its ends communicate with the fourth valve chamber (17d) and another end connected to a thirteenth short pipe (T13).

The separators (15a, 15b, 15c, 15d) have shaft hole portions (18a, 18b, 18c, 18d) axially penetrating the centers of the separators (15a, 15b, 15c, 15d). The drive shaft (40) of the drive mechanism (30) is slidably fitted in the shaft hole portions (18a, 18b, 18c, 18d).

<Drive Mechanism>

As illustrated in FIG. 2, the drive mechanism (30) includes the stepping motor (31), the approximately bottomed-cylindrical variable-speed gear (32), and the drive shaft (40).

The stepping motor (31) is attached to the upper surface of the upper closer (13) in the valve case (11). As described above, the rotation shaft (31a) of the stepping motor (31) is slidably fitted in the shaft hole of the upper closer (13). An end of the rotation shaft (31a) is coupled to the variable-speed gear (32) in the housing chamber (16) of the valve case (11). The drive shaft (40) extends from the bottom surface of the variable-speed gear (32). As described above, the drive shaft (40) is slidably fitted in the shaft hole portions (18a, 18b, 18c, 18d) of the separators (15a, 15b, 15c, 15d).

The valve bodies (50) housed in the valve chambers (17a, 17b, 17c, 17d) are fixed to the drive shaft (40). A turning force of the stepping motor (31) is transmitted to the variable-speed gear (32) via the rotation shaft (31a) of the stepping motor (31), is subjected to a shift in the variable-speed gear (32), and then is transmitted to the valve bodies (50) via the drive shaft (40).

<Passage Switch>

As described above, the first through fourth passage switches (20a, 20b, 20c, 20d) include the first through fourth valve chambers (17a, 17b, 17c, 17d) and the valve bodies (50) housed in the valve chambers (17a, 17b, 17c, 17d). These valve bodies (50) are coupled to the drive shaft (40) via keys (51) individually provided for the valve bodies (50) (see FIGS. 4A and 4B). Rotation of the drive shaft (40) displaces all the valve bodies (50) in synchronization.

Figure 5:
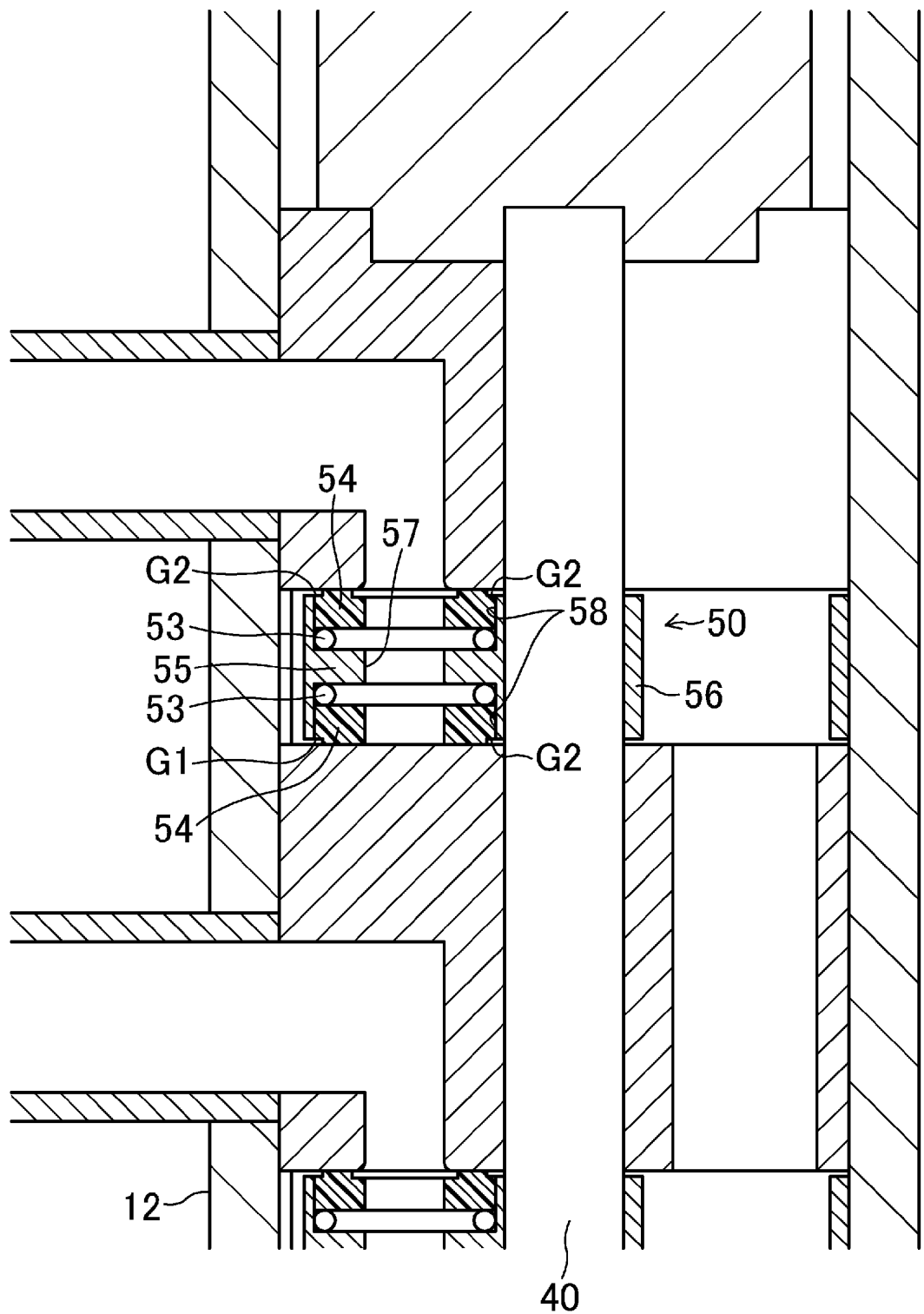
FIG. 5 is a longitudinal cross-sectional view illustrating a portion including the valve body of the combined valve.

As illustrated in FIGS. 4A, 4B, and 5, each of the valve bodies (50) includes a cylindrical part (55) formed around the axis of the drive shaft (40) and a joint part (56) joining the cylindrical part (55) and the drive shaft (40) such that the cylindrical part (55) and the drive shaft (40) are integrated.

The cylindrical part (55) has a general outline of an arc shape, a bean shape, or a fan shape formed along the drive shaft (40) in cross section perpendicular to the axis. The cylindrical part (55) divides the inside of each of the valve chambers (17a, 17b, 17c, 17d) into an inner space (IS) located at the inner side of the cylindrical part (55) and an outer space (OS) located at an outer side of the cylindrical part (55).

The cylindrical part (55) circumferentially extends to form an angle of about 120° about the axial center of the drive shaft (40). In the cylindrical part (55), a ring-shaped projection (57) projects radially inward from the inner surface of the cylindrical part (55) at an axially intermediate point of the inner surface. The ring-shaped projection (57) extends over the entire region of the inner circumference of the cylindrical part (55). In this manner, large openings (58, 58) are formed at both axial sides of the ring-shaped projection (57) of the cylindrical part (55). That is, the large openings (58, 58) have opening widths larger than the inner width of the ring-shaped projection (57).

In each of the valve bodies (50), O rings (53, 53) are individually fitted in the pair of large openings (58, 58) to be in contact with the ring-shaped projection (57). Each of the O rings (53, 53) has a ring shape extending along the step of the ring-shaped projection (57). Each of the O rings (53, 53) seals a gap between the inner space (IS) and the outer space (OS) of an associated one of the valve chambers (17a, 17b, 17c, 17d).

Figure 6:
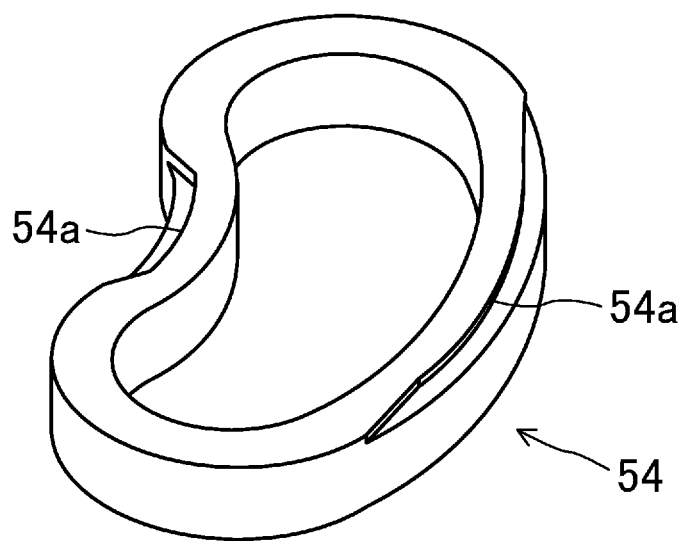
FIG. 6 is a full view of a gasket of the combined valve.

In each of the valve bodies (50), gaskets (54, 54) are fitted in the pair of large openings (58, 58) to overlap the O rings (53, 53). As illustrated in FIG. 6, each of the gaskets (54, 54) has a ring shape extending along an associated one of the O rings (53, 53). A pair of opposing steps (54a) are formed at the outer edges of the upper end surface of each of the gaskets (54, 54). The gaskets (54) constitute a seal member for sealing a gap between the inner space (IS) and the outer space (OS) in each of the valve chambers (17a, 17b, 17c, 17d).

The tip of each of the gaskets (54, 54) projects outward from an axial end surface of the valve body (50), and is in contact with both axial end surfaces (i.e., the lower surface and the upper surface) of each of the valve chambers (17a, 17b, 17c, 17d). In this manner, a cylindrical gap (G1) is formed at the outer periphery of the lower gasket (54) between an axial end surface of the valve body (50) and the lower surface of each of the valve chambers (17a, 17b, 17c, 17d). That is, the gap (G1) surrounds the entire circumference of the lower gasket (54). Similarly, a cylindrical gap (G2) is formed at the outer periphery of the upper gasket (54) between another axial end surface (i.e., the upper end surface) of the valve body (50) and the upper surface of each of the valve chambers (17a, 17b, 17c, 17d). That is, the gap (G2) surrounds the entire circumference of the upper gasket (54).

As described above, in this embodiment, the back-pressure spaces (G1, G2) to which the same pressure is applied are formed at both axial ends of each of the valve bodies (50). In this manner, pressing forces applied to the axial end surfaces of each of the valve bodies (50) act in opposite directions. For example, if suppose a gap were formed only in one axial end surface of each of the valve bodies (50) and a pressing force were applied on this end surface, the valve body (50) would be pressed in one direction. Consequently, a sliding friction occurring at driving of each of the valve bodies (50) would increase. In this embodiment, however, pressing forces applied to both axial ends of each of the valve bodies (50) act in opposite directions, and thus, such an increase in sliding friction can be reduced.

Figure 7A:
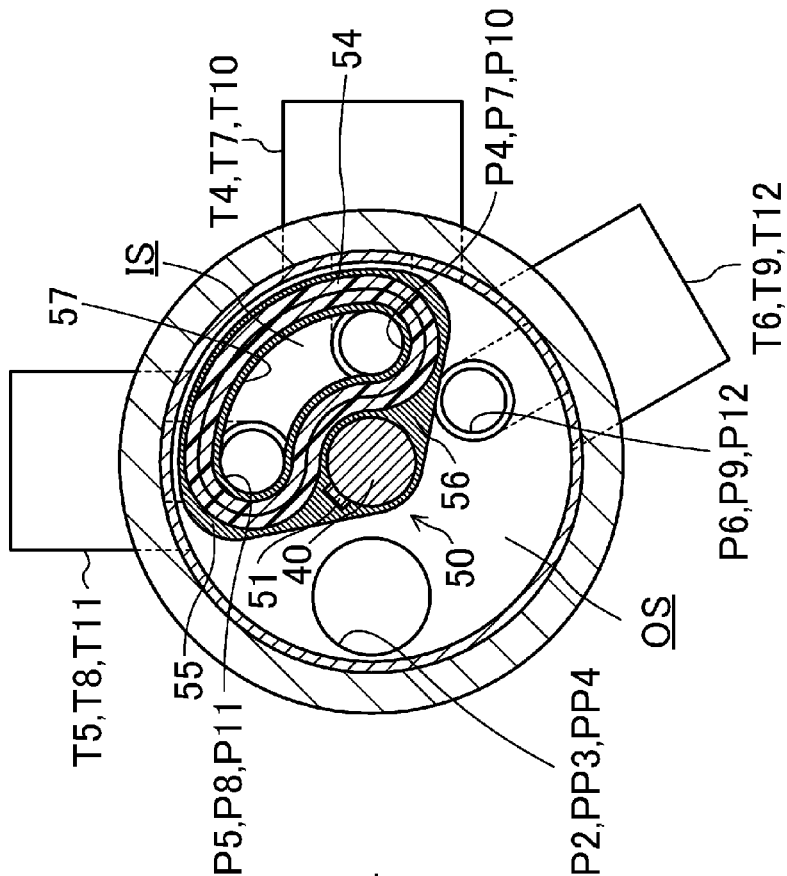
FIGS. 7A and 7B are transverse cross-sectional views of the combined valve when the valve body is at a first position.
Figure 7B:
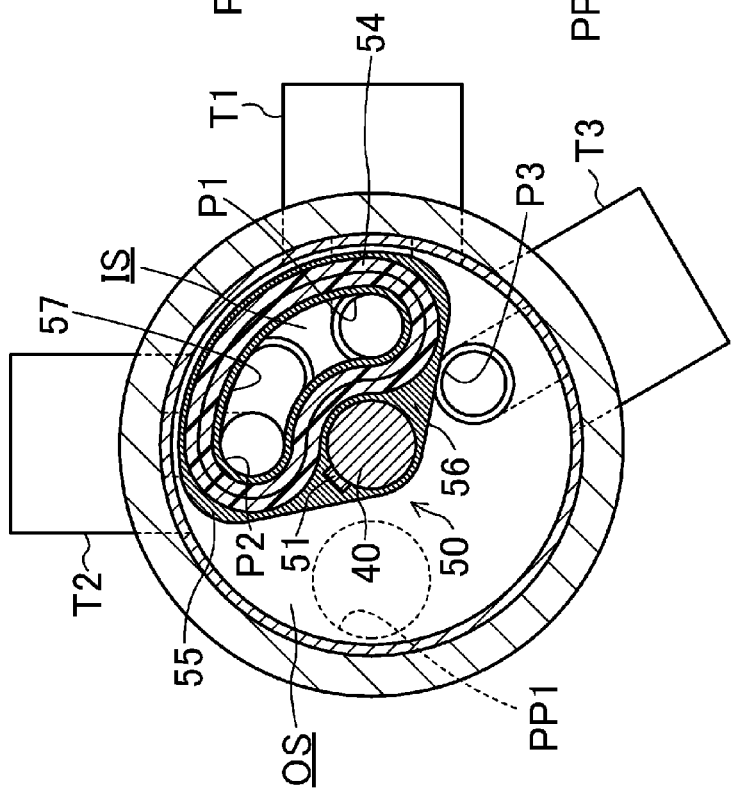

With rotation of the drive shaft (40), the valve bodies (50) in the valve chambers (17a, 17b, 17c, 17d) are displaced at the same time between a first position illustrated in FIGS. 7A and 7B and a second position illustrated in FIGS. 8A and 8B. A state in which the four valve bodies (50) are at the first position is a first state of the combined valve (10). A state in which the four valve bodies (50) are at the second position is a second state of the combined valve (10).

As illustrated in FIGS. 7A, 7B, 8A, and 8B, in the first passage switch (20a), when the valve body (50) is at the first position, the first port (P1) and the second port (P2) communicate with each other and the third port (P3) and the first communication port (PP1) communicate with each other, whereas when the valve body (50) is at the second position, the first port (P1) and the third port (P3) communicate with each other and the second port (P2) and the first communication port (PP1) communicate with each other.

In the second passage switch (20b), when the valve body (50) is at the first position, the fourth port (P4) and the fifth port (P5) communicate with each other and the sixth port (P6) and the second communication port (PP2) communicate with each other, whereas when the valve body (50) is at the second position, the fourth port (P4) and the sixth port (P6) communicate with each other and the fifth port (P5) and the second communication port (PP2) communicate with each other.

In the third passage switch (20c), when the valve body (50) is at the first position, the seventh port (P7) and the eighth port (P8) communicate with each other and the ninth port (P9) and the third communication port (PP3) communicate with each other, whereas when the valve body (50) is at the second position, the seventh port (P7) and the ninth port (P9) communicate with each other and the eighth port (P8) and the third communication port (PP3) communicate with each other.

In the fourth passage switch (20d), when the valve body (50) is at the first position, the tenth port (P10) and the eleventh port (P11) communicate with each other and the twelfth port (P12) and the fourth communication port (PP4) communicate with each other, whereas when the valve body (50) is at the second position, the tenth port (P10) and the twelfth port (P12) communicate with each other and the eleventh port (P11) and the fourth communication port (PP4) communicate with each other. In this manner, each of the valve bodies (50) is rotated in the valve case (11) to slide and move on the openings of the predetermined ports (P1, P2, P3, . . . ), thereby switching the communication state among the ports (P1, P2, P3, . . . ). The control of switching of the communication state among the ports (P1, P2, P3, . . . ), i.e., control of the stepping motor (31), is performed by controller (500), which will be described later.

—Refrigerant Circuit of Air Conditioner—

The refrigerant circuit (61) to which the combined valve (10) is connected will now be described. The refrigerant circuit (61) is installed in, for example, an air conditioner that can be switched between cooling operation and heating operation. The refrigerant circuit (61) is filled with carbon dioxide (hereinafter referred to as refrigerant), and configured to perform a multistage compression supercritical refrigeration cycle by circulating refrigerant in the refrigerant circuit (61).

Figure 9:
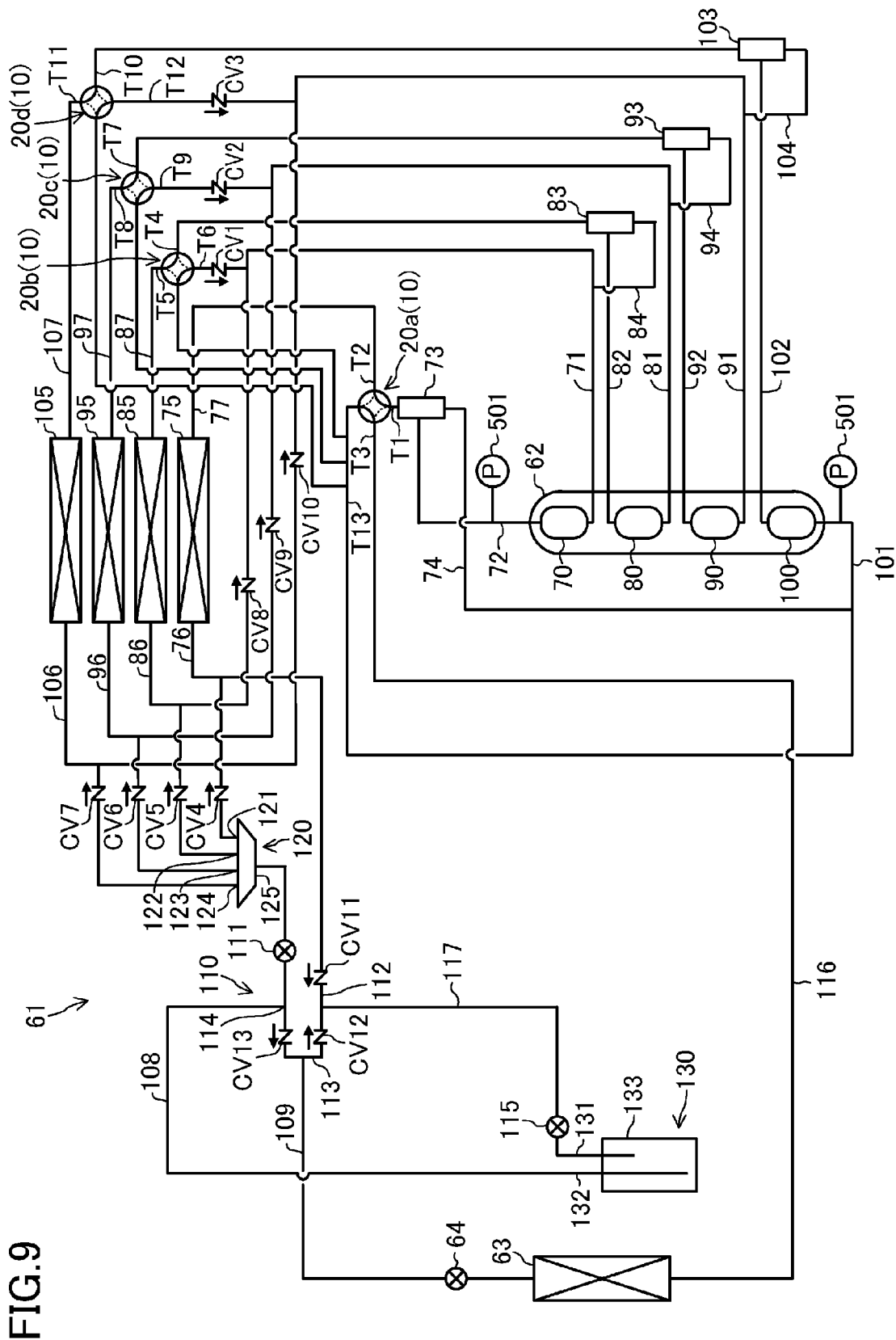
FIG. 9 is a circuit diagram of a refrigerant circuit to which the combined valve is connected.

As illustrated in FIG. 9, the refrigerant circuit (61) is connected to a four-stage compressor (62), first through fourth outdoor heat exchangers (75, 85, 95, 105), an indoor expansion valve (64), an outdoor expansion valve (111), and an indoor heat exchanger (63). In this embodiment, the first outdoor heat exchanger (75) is a heat-source-side heat exchanger, and the second through fourth outdoor heat exchangers (85, 95, 105) are first through third internal heat exchangers, respectively.

In addition to these main components, the refrigerant circuit (61) is also connected to first through fourth oil separators (73, 83, 93, 103), a receiver (130), a distributor (120), a bridge circuit (110), and check valves (CV1-CV10), for example. The refrigerant circuit (61) is also connected to the combined valve (10) described above. As described above, the combined valve (10) includes a stack of the passage switches (20a, 20b, 20c, 20d) arranged in the up and down direction. In FIG. 9, however, the passage switches (20a, 20b, 20c, 20d) are separated from one another for easiness of understanding. The air conditioner includes the controller (500) that controls operation of the refrigerant circuit (61).

The four-stage compressor (62) includes first through fourth compressors (70, 80, 90, 100). The first through fourth compressors (70, 80, 90, 100) are connected to first through fourth discharge pipes (72, 82, 92, 102) at discharge sides thereof, while being connected to first through fourth suction pipes (71, 81, 91, 101) at suction sides thereof. Each of the compressors (70, 80, 90, 100) compresses low-pressure gas refrigerant sucked through an associated one of the suction pipes (71, 81, 91, 101) to a predetermined pressure to be high pressure gas refrigerant, which is then discharged from the discharge pipes (72, 82, 92, 102).

The fourth suction pipe (101) of the fourth compressor (100) is connected to the thirteenth short pipe (T13) of the combined valve (10). The third suction pipe (91) of the third compressor (90) is connected to the twelfth short pipe (T12) of the combined valve (10). The second suction pipe (81) of the second compressor (80) is connected to the ninth short pipe (T9) of the combined valve (10). The first suction pipe (71) of the first compressor (70) is connected to the sixth short pipe (T6) of the combined valve (10).

The check valves (CV1, CV2, CV3) are connected to midpoints of the first through third suction pipes (71, 81, 91). Each of the check valves (CV1, CV2, CV3) allows refrigerant to flow from the combined valve (10) to the four-stage compressor (62), and prevents refrigerant from flowing in a reverse direction.

The fourth discharge pipe (102) of the fourth compressor (100) is connected to the tenth short pipe (T10) of the combined valve (10). The third discharge pipe (92) of the third compressor (90) is connected to the seventh short pipe (T7) of the combined valve (10). The second discharge pipe (82) of the second compressor (80) is connected to the fourth short pipe (T4) of the combined valve (10). The first discharge pipe (72) of the first compressor (70) is connected to the first short pipe (T1) of the combined valve (10).

The first through fourth oil separators (73, 83, 93, 103) are connected to midpoints of the first through fourth discharge pipes (72, 82, 92, 102). Each of the oil separators (73, 83, 93, 103) separates lubricating oil contained in high pressure gas refrigerant flowing in the discharge pipe (72, 82, 92, 102) from the high pressure gas refrigerant. The oil separators (73, 83, 93, 103) are connected to the first through fourth oil outflow pipes (74, 84, 94, 104) through which lubricating oil separated in the oil separators (73, 83, 93, 103) flows out of the oil separators (73, 83, 93, 103).

The fourth oil outflow pipe (104) is connected to the third suction pipe (91). The third oil outflow pipe (94) is connected to the second suction pipe (81). The second oil outflow pipe (84) is connected to the first suction pipe (71). The first oil outflow pipe (74) is connected to the fourth suction pipe (101).

Lubricating oil separated in the fourth oil separator (103) is sent to the third suction pipe (91) through the fourth oil outflow pipe (104). Lubricating oil separated in the third oil separator (93) is sent to the second suction pipe (81) through the third oil outflow pipe (94). Lubricating oil separated in the second oil separator (83) is sent to the first suction pipe (71) through the second oil outflow pipe (84). Lubricating oil separated in the first oil separator (73) is sent to the fourth suction pipe (101) through the first oil outflow pipe (74). The first through fourth outdoor heat exchangers (75, 85, 95, 105) are fin-and-tube heat exchangers. Outdoor fans (not shown) are provided near the outdoor heat exchangers (75, 85, 95, 105). The outdoor heat exchangers (75, 85, 95, 105) are configured to perform heat exchange between outdoor air from the outdoor fan and refrigerant flowing in heat exchanger tubes of the outdoor heat exchangers (75, 85, 95, 105).

An end of each of the ninth through twelfth refrigerant pipes (77, 87, 97, 107) is connected to one end of a heat exchanger tube of the first outdoor heat exchanger (75). The other end of the ninth refrigerant pipe (77) is connected to the second short pipe (T2) of the combined valve (10). The other end of the tenth refrigerant pipe (87) is connected to the fifth short pipe (T5) of the combined valve (10). The other end of the eleventh refrigerant pipe (97) is connected to the eighth short pipe (T8) of the combined valve (10). The other end of the twelfth refrigerant pipe (107) is connected to the eleventh short pipe (T11) of the combined valve (10). On the other hand, an end of each of the first through fourth refrigerant pipes (76, 86, 96, 106) is connected to the other end of the heat exchanger tube of an associated one of the first through fourth outdoor heat exchangers (75, 85, 95, 105).

The other end of the first refrigerant pipe (76) branches off into two parts, one of which is connected to a first check valve (CV11) of the bridge circuit (110) and the other of which is connected to a first outlet (121) of the distributor (120). A check valve (CV4) is provided between the branch point of the first refrigerant pipe (76) and the first outlet (121) of the distributor (120). The check valve (CV4) allows refrigerant to flow from the distributor (120) to the branch point of the first refrigerant pipe (76), and prevents refrigerant from flowing in a reverse direction.

The other end of each of the second through fourth refrigerant pipes (86, 96, 106) branches off into two parts, one of which is connected to a midpoint of an associated one of the first through third suction pipes (71, 81, 91) (between the check valve (CV1, CV2, CV3) and the compressor (70, 80, 90)) and the other of which is connected to an associated one of the second through fourth outlets (122, 123, 124) of the distributor (120).

The check valves (CV5, CV6, CV7) are provided between the branch points of the second through fourth refrigerant pipes (86, 96, 106) and the second through fourth outlets (122, 123, 124) of the distributor (120). Each of the check valves (CV5, CV6, CV7) allows refrigerant to flow from the distributor (120) to the branch point of an associated one of the second through fourth refrigerant pipes (86, 96, 106), and prevents refrigerant from flowing in a reverse direction.

The check valves (CV8, CV9, CV10) are provided between the branch points of the second through fourth refrigerant pipes (86, 96, 106) and the connection points of the first through third suction pipe (71, 81, 91). Each of the check valves (CV8, CV9, CV10) allows refrigerant to flow from the branch point of an associated one of the second through fourth refrigerant pipes (86, 96, 106) to the connection point of an associated one of the first through third suction pipes (71, 81, 91), and prevents refrigerant from flowing in a reverse direction.

The distributor (120) has an inlet (125) and first through fourth outlets (122-124). The distributor (120) branches refrigerant from the inlet (125) into four parts, which flow out of the outlets (122-124) respectively. As described above, each of the first through fourth outlets (122-124) is connected to the other end of an associated one of the first through fourth refrigerant pipes (76, 86, 96, 106).

The bridge circuit (110) includes the first through third check valves (CV11-CV13), the outdoor expansion valve (111), and first through third pipes (112-114). An end of the first check valve (CV11) is connected to an end of the second check valve (CV12) by the first pipe (112). The other end of the second check valve (CV12) is connected to an end of the third check valve (CV13) by the second pipe (113). The other end of the third check valve (CV13) is connected to an end of the outdoor expansion valve (111) by the third pipe (114). As described above, the other end of the first check valve (CV11) is connected to the other end of the first refrigerant pipe (76). The other end of the outdoor expansion valve (111) is connected to the inlet (125) of the distributor (120). The outdoor expansion valve (111) adjusts the pressure of refrigerant passing through the outdoor expansion valve (111) in heating operation.

The first check valve (CV11) allows refrigerant to flow from the first refrigerant pipe (76) to the first pipe (112), and prevents refrigerant from flowing in a reverse direction. The second check valve (CV12) allows refrigerant to flow from the second pipe (113) to the first pipe (112), and prevents refrigerant from flowing in a reverse direction. The third check valve (CV13) allows refrigerant to flow from the third pipe (114) to the second pipe (113), and prevents refrigerant from flowing in a reverse direction.

The receiver (130) includes an approximately cylindrical body (133), an inflow pipe (131), and an outflow pipe (132). The inflow pipe (131) and the outflow pipe (132) penetrate the top of the body (133). An end of the inflow pipe (131) is open to an upper space of the body (133). An end of the outflow pipe (132) is open to a lower space of the body (133). In the receiver (130), high-pressure refrigerant that has flown into the body (133) through the inflow pipe (131) is temporarily stored in the body (133) and then flows out of the body (133) through the outflow pipe (132).

The fifth refrigerant pipe (117) branching off from the first pipe (112) of the bridge circuit (110) is connected to the inflow pipe (131) of the receiver (130). The sixth refrigerant pipe (108) connected to the outflow pipe (132) of the receiver (130) is connected to a midpoint of the third pipe (114) of the bridge circuit (110). The fifth refrigerant pipe (117) includes a second flow-rate control valve (115). The second flow-rate control valve (115) adjusts the flow rate of refrigerant flowing in the fifth refrigerant pipe (117).

The seventh refrigerant pipe (109) branching off from the second pipe (113) of the bridge circuit (110) is connected to an end of the indoor heat exchanger (63) through the indoor expansion valve (64). The indoor expansion valve (64) reduces the pressure of refrigerant flowing toward the indoor heat exchanger (63) to a predetermined value.

The indoor heat exchanger (63) is a fin-and-tube heat exchanger. The indoor heat exchanger (63) is located indoors. An indoor fan (not shown) located indoors is provided near the indoor heat exchanger (63). The indoor heat exchanger (63) is configured to perform heat exchange between indoor air from the indoor fan and refrigerant flowing in the indoor heat exchanger (63). The eighth refrigerant pipe (116) extending from the other end of the indoor heat exchanger (63) is connected to the third short pipe (T3) of the combined valve (10).

<Controller (500)>

The controller (500) receives values detected by a temperature sensor (not shown) and a pressure sensor (501) provided in the refrigerant circuit (61). Based on these detected values, the controller (500) controls operation of the refrigerant circuit (61) while controlling driving of the four-stage compressor (62), the indoor fan, and the outdoor fan, switching and opening degree adjustment of the combined valve (10), the indoor expansion valve (64), and the outdoor expansion valve (111). The switching of the combined valve (10) by the controller (500) will be described later.

—Operational Behavior—

The air conditioner of this embodiment is configured to perform cooling operation and heating operation. Based on control of the controller (500) described above, the air conditioner is switched between cooling operation and heating operation.

<Cooling Operation>

Figure 10:
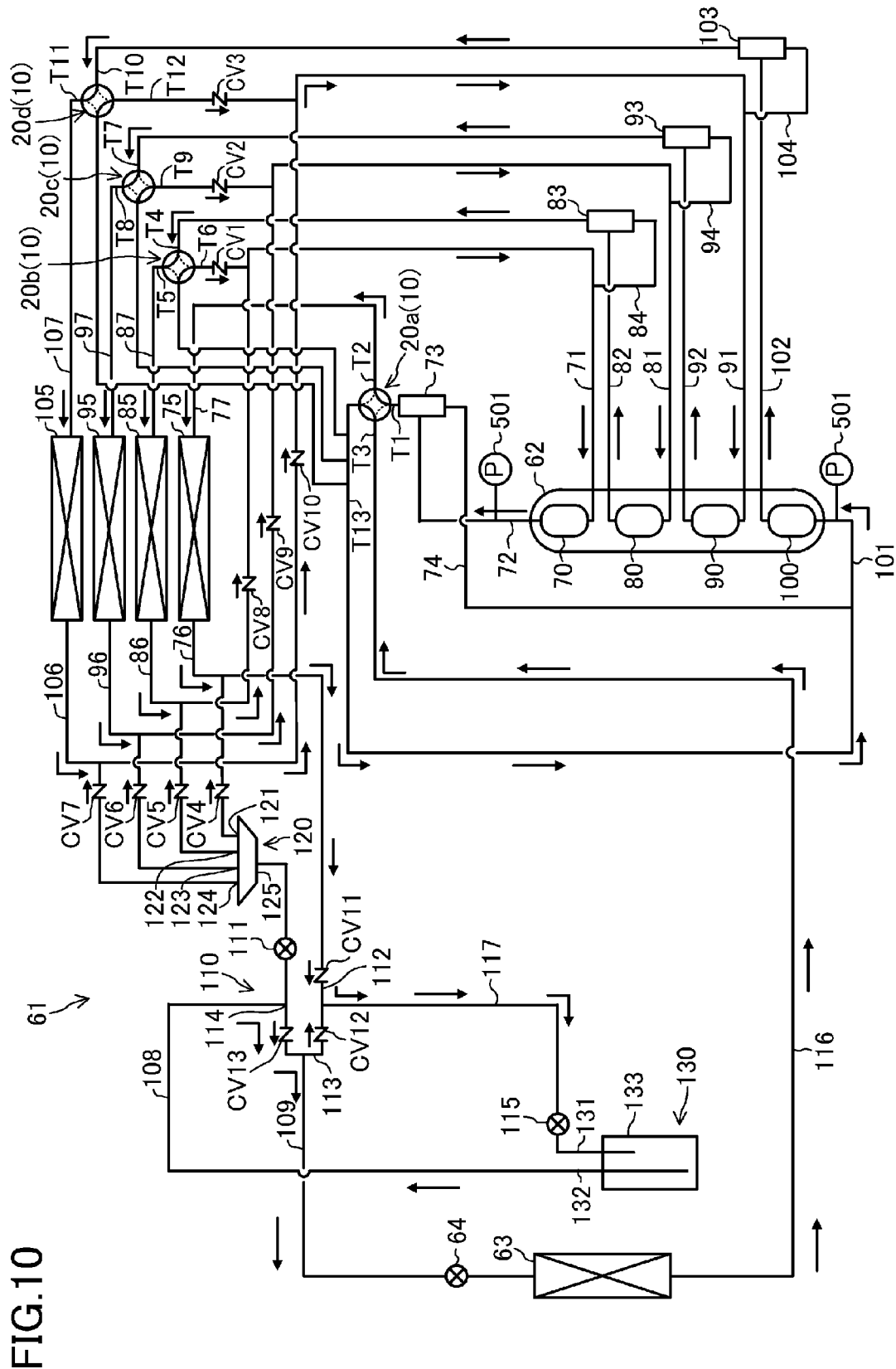
FIG. 10 demonstrates a refrigerant flow in the refrigerant circuit in cooling operation.
Figure 11:
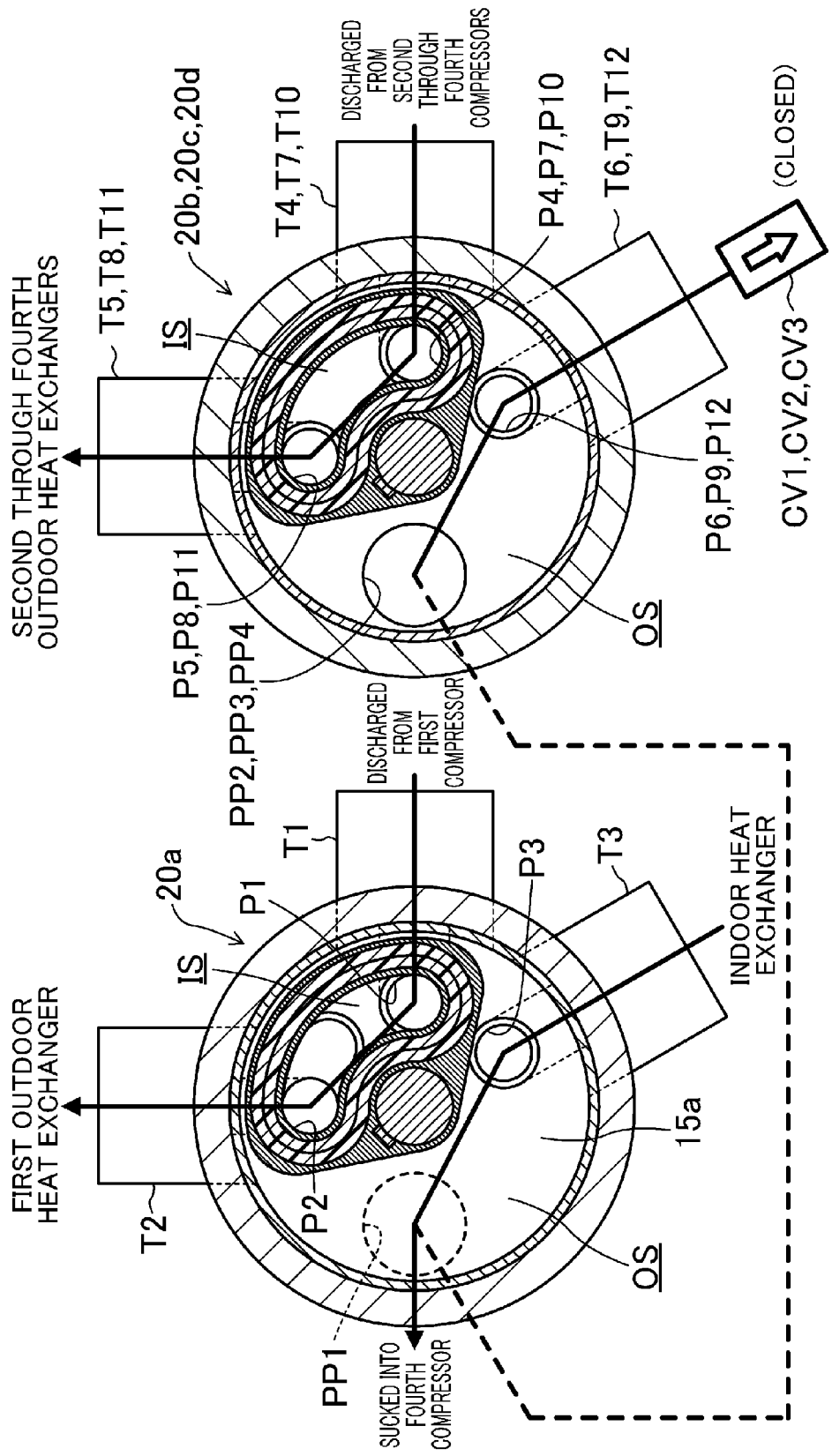
FIG. 11 demonstrates refrigerant flows in the combined valve in cooling operation and the first through fourth passage switches.

Cooling operation of the air conditioner will be described with reference to FIGS. 10 and 11. In FIG. 10, flows of refrigerant in this cooling operation are indicated by arrows of continuous line. In the cooling operation, the first outdoor heat exchanger (75) operates as a heat dissipater, and the indoor heat exchanger (63) operates as an evaporator, thereby performing four-stage compression supercritical refrigeration cycle. The second through fourth outdoor heat exchangers (85, 95, 105) operate as coolers that cool high-pressure refrigerant discharged from the compressors (70, 80, 90, 100).

In the cooling operation, a line from the first compressor (70) of the four-stage compressor (62) to the indoor expansion valve (64) is a high-pressure line, and a line from the indoor expansion valve (64) to the fourth compressor (100) of the four-stage compressor (62) is a low-pressure line. The high-pressure line herein is a line in which high-pressure refrigerant compressed to a supercritical pressure in the first compressor (70) flows. The low-pressure line herein is a line in which low-pressure refrigerant whose pressure has been reduced in the indoor heat exchanger (63) flows.

In the cooling operation, based on control of the controller (500) described above, the combined valve (10) is set at the first position. As described above, when the combined valve (10) is at the first position, all the valve bodies (50) in the combined valve (10) are at the first positions.

In addition, the outdoor expansion valve (111) is fully closed, and the opening degrees of the second flow-rate control valve (115) and the indoor expansion valve (64) are appropriately adjusted. In the check valves (CV1, CV2, CV3) of the first through third suction pipes (71, 81, 91), the refrigerant pressures downstream of the valves are higher than those upstream of the vales, and thus, the valve bodies of the check valves (CV1, CV2, CV3) do not open. Accordingly, the check valves (CV1, CV2, CV3) are in closed states. In this manner, only the sixth port (P6), the ninth port (P9), and the twelfth port (P12) of the combined valve (10) are closed.

(Refrigerant Flow at High-Pressure Side in Combined Valve)

Refrigerant sucked in the fourth compressor (100) of the four-stage compressor (62) is compressed to a predetermined pressure. This compression will be referred to as a first compression. The refrigerant subjected to the first compression is discharged from the fourth compressor (100), passes through the fourth discharge pipe (102) and the fourth oil separator (103), and flows into the fourth passage switch (20d) of the combined valve (10). This refrigerant flows from the tenth port (P10) of the fourth passage switch (20d) into the inner space (IS) of the fourth valve chamber (17d), and then flows out of the inner space (IS) of the fourth valve chamber (17d) through the eleventh port (P11) (see FIG. 11). Then, the refrigerant flows into the fourth outdoor heat exchanger (105). In the fourth outdoor heat exchanger (105), the refrigerant dissipates heat to outdoor air from the outdoor fan to be cooled. This cooling will be hereinafter referred to as first cooling. The refrigerant subjected to the first cooling passes through the fourth refrigerant pipe (106) and the third suction pipe (91) and is sucked into the third compressor (90).

The refrigerant sucked into the third compressor (90) is compressed to a predetermined pressure. This compression will be hereinafter referred to as a second compression. The refrigerant subjected to the second compression is discharged from the third compressor (90), passes through the third discharge pipe (92) and the third oil separator (93), and flows into the third passage switch (20c) of the combined valve (10). This refrigerant flows from the seventh port (P7) of the third passage switch (20c) into the inner space (IS) of the third valve chamber (17c), and then flows out of the inner space (IS) of the third valve chamber (17c) through the eighth port (P8) (see FIG. 11). Then, this refrigerant flows into the third outdoor heat exchanger (95). In the third outdoor heat exchanger (95), the refrigerant dissipates heat to outdoor air from the outdoor fan to be cooled. This cooling will be hereinafter referred to as a second cooling. The refrigerant subjected to the second cooling passes through the third refrigerant pipe (96) and the second suction pipe (81) and is sucked into the second compressor (80).

The refrigerant sucked into the second compressor (80) is compressed to a predetermined pressure. This compression will be hereinafter referred to as a third compression. The refrigerant subjected to the third compression is discharged from the second compressor (80), passes through the second discharge pipe (82) and the second oil separator (83), and then flows into the second passage switch (20b) of the combined valve (10). This refrigerant flows from the fourth port (P4) of the second passage switch (20b) into the inner space (IS) of the second valve chamber (17b), and flows out of the inner space (IS) of the second valve chamber (17b) through the fifth port (P5) (see FIG. 11). This refrigerant flows into the second outdoor heat exchanger (85). In the second outdoor heat exchanger (85), the refrigerant dissipates heat to outdoor air from the outdoor fan to be cooled. This cooling will be hereinafter referred to as a third cooling. The refrigerant subjected to the third cooling passes through the second refrigerant pipe (86) and the first suction pipe (71) and is sucked into the first compressor (70).

The refrigerant sucked into the first compressor (70) is compressed to a predetermined pressure. This compression will be hereinafter referred to as a fourth compression. In this manner, in the cooling operation, four-stage compression is performed with compression and cooling being alternately repeated. Thus, the compression strokes of the four-stage compressor (62) approaches those in isothermal compression as closely as possible in order to reduce compression power necessary for the four-stage compressor (62). The four-stage compression of the four-stage compressor (62) increases the pressure of refrigerant discharged from the four-stage compressor (62) to the level higher than the critical pressure of the refrigerant.

The refrigerant subjected to the fourth compression is discharged from the first compressor (70) and then flows into the first passage switch (20a) of the combined valve (10) through the first discharge pipe (72). This refrigerant flows from the first port (P1) of the first passage switch (20a) into the inner space (IS) of the first valve chamber (17a) and then flows out of the inner space (IS) of the first valve chamber (17a) through the second port (P2) (see FIG. 11). This refrigerant flows into the first outdoor heat exchanger (75). In the first outdoor heat exchanger (75), the refrigerant dissipates heat to outdoor air from the outdoor fan to be cooled.

(Refrigerant Flow after Passing Through Combined Valve)

Refrigerant that has flown out of the first outdoor heat exchanger (75) flows into the bridge circuit (110) through the first refrigerant pipe (76). This refrigerant passes through the first check valve (CV11) and the first pipe (112) of the bridge circuit (110) and then passes through the fifth refrigerant pipe (117). While passing through the fifth refrigerant pipe (117), the flow rate of the refrigerant is appropriately adjusted by the second flow-rate control valve (115). The refrigerant whose flow rate has been adjusted by the second flow-rate control valve (115) flows into the receiver (130).

Part of the refrigerant that has flown into the receiver (130) is stored in the receiver (130), and the other part of the refrigerant flows out of the receiver (130). The refrigerant that has flown out of the receiver (130) flows into the bridge circuit (110) again through the sixth refrigerant pipe (108). This refrigerant passes through the third pipe (114) and the third check valve (CV13) of the bridge circuit (110) and then passes through the seventh refrigerant pipe (109).

While passing through the seventh refrigerant pipe (109), the pressure of the refrigerant is reduced to a desired value by the indoor expansion valve (64). The refrigerant whose pressure has been reduced by the indoor expansion valve (64) flows into the indoor heat exchanger (63). The opening degree of the indoor expansion valve (64) can be adjusted such that the superheat degree of refrigerant flowing out of the indoor heat exchanger (63) is constant.

The refrigerant that has flown into the indoor heat exchanger (63) absorbs heat from indoor air from the indoor fan to evaporate and then flows out of the indoor heat exchanger (63). This evaporation of refrigerant absorbs heat from indoor air to cool the indoor air. The cooled air is sent to the room, thereby cooling the room. The evaporated refrigerant flows out of the indoor heat exchanger (63).

(Refrigerant Flow at Low-Pressure Side in Combined Valve)

Figure 13:
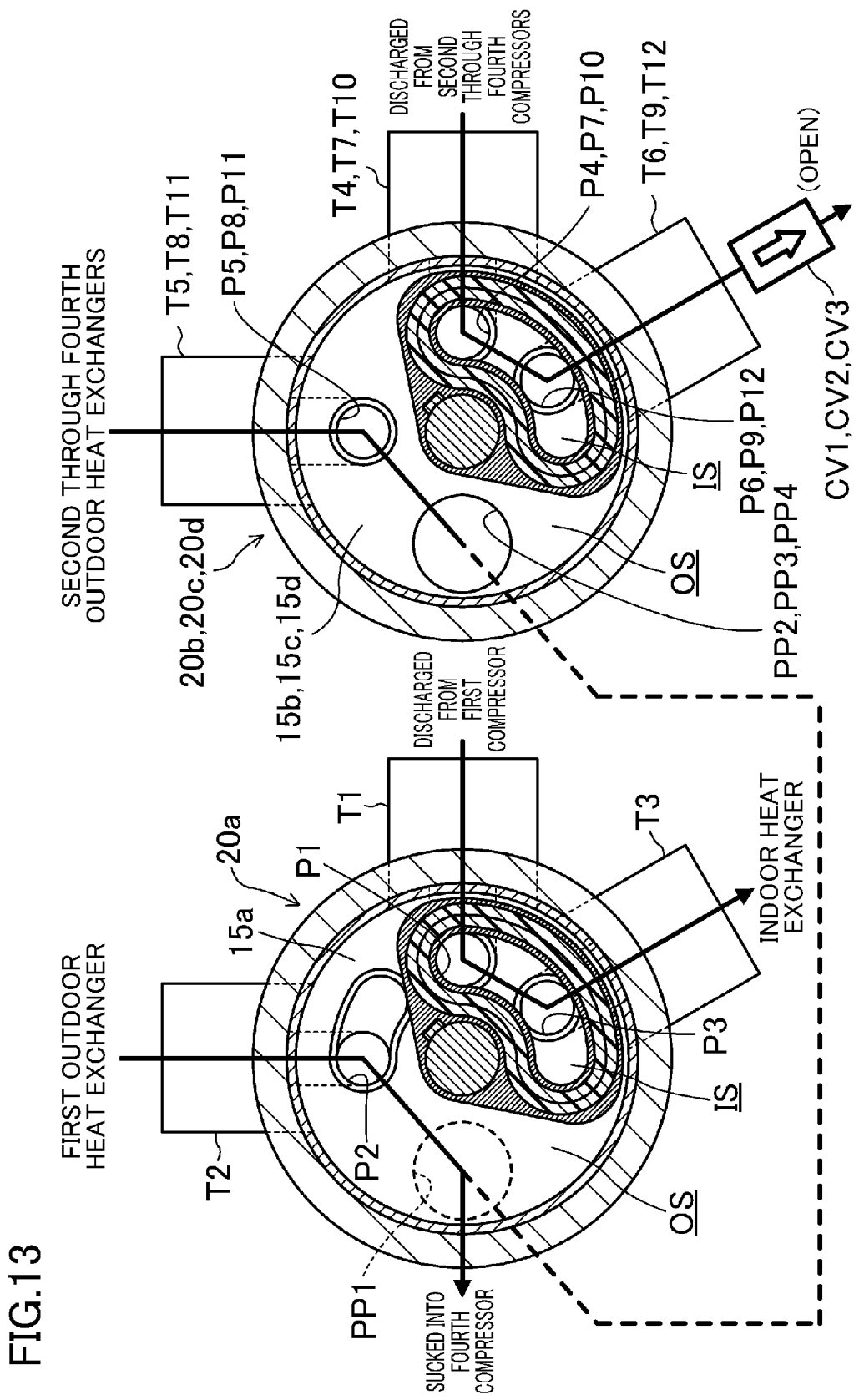
FIG. 13 demonstrates a refrigerant flow in the combined valve in heating operation, and illustrates the first through fourth passage switches.

As shown in FIGS. 2 and 13, refrigerant that has flown out of the indoor heat exchanger (63) flows into the first passage switch (20a) of the combined valve (10). This refrigerant flows from the third port (P3) of the first passage switch (20a) into the outer space (OS) of the first valve chamber (17a) and then flows out into the outer space (OS) of the second valve chamber (17b) of the second passage switch (20b) through the first communication port (PP1).

In the outer space (OS) of the second valve chamber (17b), since the check valve (CV1) communicating with the sixth port (P6) of the second passage switch (20b) is closed, the sixth port (P6) is closed. Thus, refrigerant that has flown into the outer space (OS) of the second valve chamber (17b) cannot flow out of the sixth port (P6), and flows out into the outer space (OS) of the third valve chamber (17c) of the third passage switch (20c) through the second communication port (PP2).

In the outer space (OS) of the third valve chamber (17c), since the check valve (CV2) communicating with the ninth port (P9) of the third passage switch (20c) is closed, the ninth port (P9) is closed. Thus, refrigerant that has flown into the outer space (OS) of the third valve chamber (17c) cannot flow out of the ninth port (P9), and flows out into the outer space (OS) of the fourth valve chamber (17d) of the fourth passage switch (20d) through the third communication port (PP3).

In the outer space (OS) of the fourth valve chamber (17d), since the check valve (CV1) communicating with the twelfth port (P12) of the fourth passage switch (20d) is closed, the twelfth port (P12) is closed. Thus, refrigerant that has flown into the outer space (OS) of the fourth valve chamber (17d) does not flow out of the twelfth port (P12) and remains in the fourth valve chamber (17d).

In this manner, the presence of the first through fourth communication ports (PP1-PP4) in the combined valve (10) and closing the ports (P6, P9, P12) of the combined valve (10) by the check valves (CV1, CV2, CV3) in cooling operation enables the pressures of the outer spaces (OS) of all the valve chambers (17a, 17b, 17c, 17d) of the combined valve (10) to be an identical low pressure.

Refrigerant that has flown out of the combined valve (10) passes through the fourth suction pipe (101) and then is sucked into the fourth compressor (100) of the four-stage compressor (62). Refrigerant compressed in the fourth compressor (100) flows into the eleventh port (P11) of the fourth passage switch (20d) of the combined valve (10) again through the fourth discharge pipe (102) and the fourth oil separator (103). In this manner, refrigerant circulates in the refrigerant circuit (61), thereby cooling the room.

<Heating Operation>

Figure 12:
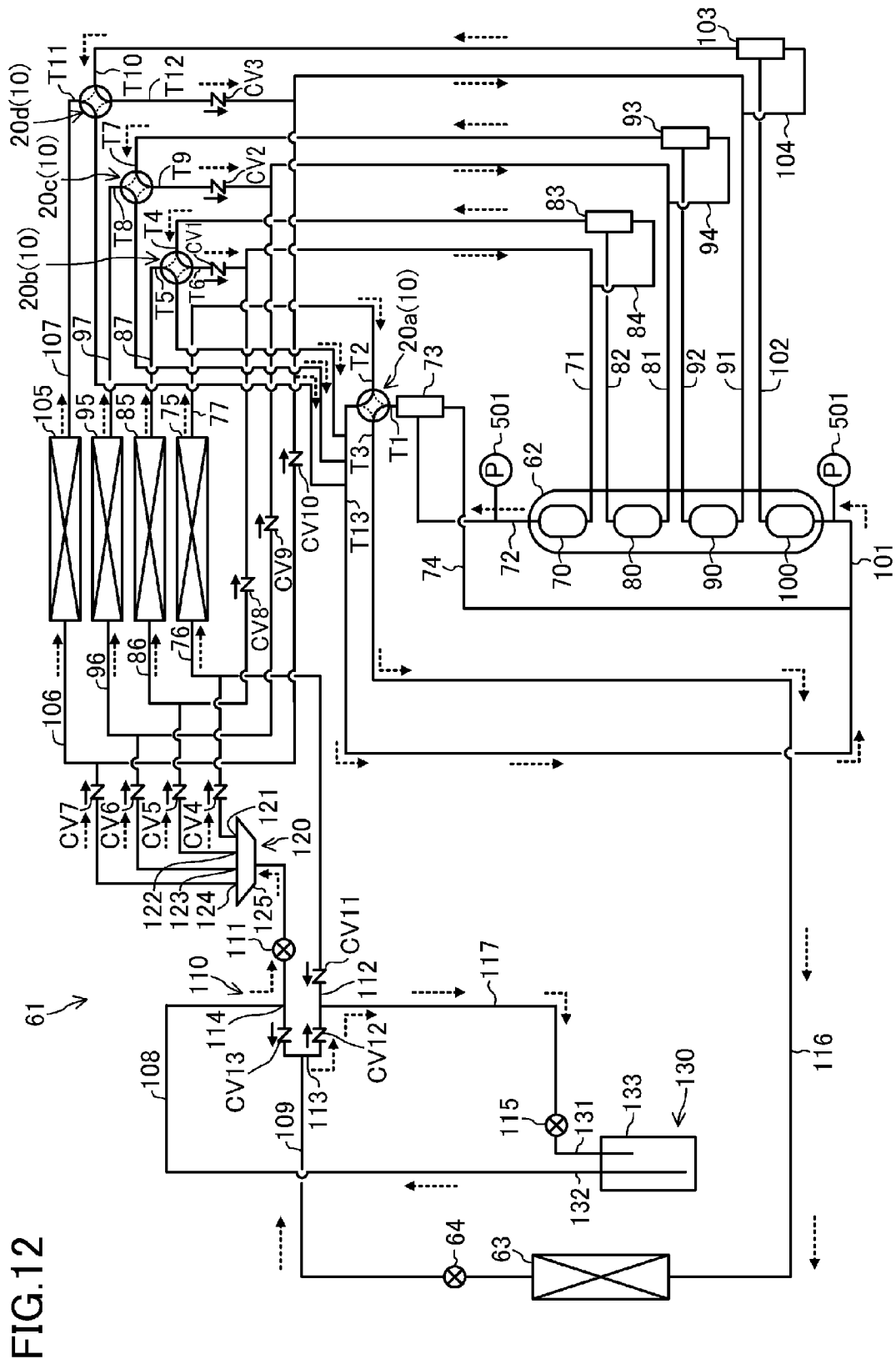
FIG. 12 demonstrates a refrigerant flow in the refrigerant circuit in heating operation.

Heating operation of the air conditioner will now be described with reference to FIGS. 12 and 13. In FIG. 12, flows of refrigerant in this heating operation are indicated by arrows of broken line. In the heating operation, the indoor heat exchanger (63) operates as a heat dissipater, and the first through fourth outdoor heat exchangers (75, 85, 95, 105) operate as evaporators, thereby performing a four-stage compression supercritical refrigeration cycle.

In the heating operation, a line from the first compressor (70) of the four-stage compressor (62) to the outdoor expansion valve (111) is a high-pressure line, and a line from the outdoor expansion valve (111) to the fourth compressor (100) of the four-stage compressor (62) is a low-pressure line.

In the heating operation, based on control of the controller (500) described above, the combined valve (10) is set at the second position. In addition, the opening degrees of the outdoor expansion valve (111), the second flow-rate control valve (115), and the indoor expansion valve (64) are appropriately adjusted.

(Refrigerant Flow at High-Pressure Side in Combined Valve)

Refrigerant sucked into the fourth compressor (100) of the four-stage compressor (62) is compressed to a predetermined pressure. This compression will be hereinafter referred to as a first compression. The refrigerant subjected to the first compression is discharged from the fourth compressor (100), passes through the fourth discharge pipe (102) and the fourth oil separator (103), and flows into the fourth passage switch (20d) of the combined valve (10). This refrigerant flows from the tenth port (P10) of the fourth passage switch (20d) into the inner space (IS) of the fourth valve chamber (17d), and then flows out of the inner space (IS) of the fourth valve chamber (17d) through the twelfth port (P12) (see FIG. 13). This refrigerant passes through the third suction pipe (91) and the check valve (CV3) and then is sucked into the third compressor (90).

The refrigerant sucked into the third compressor (90) is compressed to a predetermined pressure. This compression will be hereinafter referred to as a second compression. The refrigerant subjected to the second compression is discharged from the third compressor (90) and then flows into the third passage switch (20c) of the combined valve (10) through the third discharge pipe (92) and the third oil separator (93). This refrigerant flows from the seventh port (P7) of the third passage switch (20c) into the inner space (IS) of the third valve chamber (17c) and then flows out of the inner space (IS) of the third valve chamber (17c) through the ninth port (P9) (see FIG. 13). This refrigerant passes through the second suction pipe (81) and the check valve (CV2), and then is sucked into the second compressor (80).

The refrigerant sucked into the second compressor (80) is compressed to a predetermined pressure. This compression will be hereinafter referred to as a third compression. The refrigerant subjected to the third compression is discharged from the second compressor (80) and then flows into the second passage switch (20b) of the combined valve (10) through the second discharge pipe (82) and the second oil separator (83). This refrigerant flows from the fourth port (P4) of the second passage switch (20b) into the inner space (IS) of the second valve chamber (17b), and then flows out of the inner space (IS) of the second valve chamber (17b) through the sixth port (P6) (see FIG. 13). This refrigerant passes through the first suction pipe (71) and the check valve (CV1) and then is sucked into the first compressor (70).

The refrigerant sucked into the first compressor (70) is compressed to a predetermined pressure. This compression will be hereinafter referred to as a fourth compression. In this manner, unlike cooling operation, a four-stage compression is performed without cooling in the second through fourth outdoor heat exchangers (85-105) in the heating operation. Thus, as compared to the case of performing a four-stage compression with cooling, the temperature of refrigerant discharged from the four-stage compressor (62) does not decrease, and thus, the heating capacity in heating operation does not decrease.

Similarly to the cooling operation, in the four-stage compression of the four-stage compressor (62), the pressure of refrigerant discharged from the four-stage compressor (62) is higher than the critical pressure of this refrigerant.

The refrigerant subjected to the fourth compression is discharged from the first compressor (70) and then flows into the first passage switch (20a) of the combined valve (10) through the first discharge pipe (72) and the first oil separator (73). This refrigerant flows from the first port (P1) of the first passage switch (20a) into the inner space (IS) of the first valve chamber (17a), and then flows out of the inner space (IS) of the first valve chamber (17a) through the third port (P3) (see FIG. 13). This refrigerant passes through the eighth refrigerant pipe (116) and flows into the indoor heat exchanger (63).

(Refrigerant Flow after Passing Through Combined Valve)

Refrigerant that has flown into the indoor heat exchanger (63) dissipates heat to indoor air from the indoor fan to be cooled, and then flows out of the indoor heat exchanger (63). This heat dissipation of the refrigerant heats the indoor air. The heated air is sent to the room, thereby heating the room.

The refrigerant that has flown out of the indoor heat exchanger (63) passes through the indoor expansion valve (64) and the seventh refrigerant pipe (109) and flows into the bridge circuit (110). This refrigerant passes through the second pipe (113) and the second check valve (CV12) of the bridge circuit (110) and then passes through the fifth refrigerant pipe (117). While passing through the fifth refrigerant pipe (117), the flow rate of the refrigerant is appropriately adjusted by the second flow-rate control valve (115). The refrigerant whose flow rate has been adjusted by the second flow-rate control valve (115) flows into the receiver (130).

Part of the refrigerant that has flown into the receiver (130) is stored in the receiver (130), and the other part of the refrigerant flows out of the receiver (130). The refrigerant that has flown out of the receiver (130) flows into the bridge circuit (110) again through the sixth refrigerant pipe (108). This refrigerant passes through the third pipe (114) and the outdoor expansion valve (111) of the bridge circuit (110) and then flows into the distributor (120). While passing through the outdoor expansion valve (111), the pressure of the refrigerant is reduced to a desired value. The opening degree of the outdoor expansion valve (111) can be adjusted such that the superheat degree of refrigerant sucked into the fourth compressor (100) of the four-stage compressor (62) is constant.

The refrigerant that has flown into the distributor (120) is divided into four parts, which respectively flow into the first through fourth outdoor heat exchangers (75, 85, 95, 105) through the first through fourth refrigerant pipes (76, 86, 96, 106). In each of the outdoor heat exchangers (75, 85, 95, 105), the refrigerant absorbs heat from outdoor air from the outdoor fan to evaporate. The evaporated refrigerant flows out of the outdoor heat exchangers (75, 85, 95, 105).

(Refrigerant Flow at Low-Pressure Side in Combined Valve)

As shown in FIGS. 2 and 13, refrigerant that has flown out of the first outdoor heat exchanger (75) flows into the first passage switch (20a) of the combined valve (10). This refrigerant flows from the second port (P2) of the first passage switch (20a) into the outer space (OS) of the first valve chamber (17a) and then flows out into the outer space (OS) of the second valve chamber (17b) through the first communication port (PP1).

The refrigerant that has flown out of the second outdoor heat exchanger (85) flows into the second passage switch (20b) of the combined valve (10). This refrigerant flows from the fifth port (P5) of the second passage switch (20b) into the outer space (OS) of the second valve chamber (17b) and merges with the refrigerant from the first communication port (PP1) described above. The merged refrigerant flows out of the outer space (OS) of the second valve chamber (17b) into the outer space (OS) of the third valve chamber (17c) through the second communication port (PP2).

The refrigerant that has flown out of the third outdoor heat exchanger (95) flows into the third passage switch (20c) of the combined valve (10). This refrigerant flows from the eighth port (P8) of the third passage switch (20c) into the outer space (OS) of the third valve chamber (17c) and then merges with the refrigerant from the second communication port (PP2) described above. The merged refrigerant flows out of the outer space (OS) of the third valve chamber (17c) into the outer space (OS) of the fourth valve chamber (17d) through the third communication port (PP3).

The refrigerant that has flown out of the fourth outdoor heat exchanger (105) flows into the fourth passage switch (20d) of the combined valve (10). This refrigerant flows from the eleventh port (P11) of the fourth passage switch (20d) into the outer space (OS) of the fourth valve chamber (17d) and merges with the refrigerant from the third communication port (PP3) described above. The merged refrigerant flows out of the combined valve (10) through the fourth communication port (PP4) and the thirteenth short pipe (T13).

In this manner, the presence of the first through fourth communication ports (PP1-PP4) in the combined valve (10) enables refrigerant that has flown out of the outdoor heat exchangers (75, 85, 95, 105) into the combined valve (10) to merge together in the combined valve (10) and then flow out of the combined valve (10). In addition, the presence of the first through fourth communication ports (PP1-PP4) in the combined valve (10) enables the pressures of the outer spaces (OS) of all the valve chambers (17a, 17b, 17c, 17d) of the combined valve (10) to be an identical low pressure.

The refrigerant that has flown out of the combined valve (10) passes through the fourth refrigerant pipe (106) and then is sucked into the fourth compressor (100) of the four-stage compressor (62). The refrigerant compressed in the fourth compressor (100) passes through the fourth discharge pipe (102) and the fourth oil separator (103) and then flows into the eleventh port (P11) of the fourth passage switch (20d) of the combined valve (10) again. In this manner, refrigerant circulates in the refrigerant circuit (61), thereby heating the room.

<Control of Stepping Motor by Controller>

The controller (500) includes a microcomputer (not shown) and a program for the microcomputer to control a drive start, a drive stop, and a rotation speed of the stepping motor (31). The rotation speed, for example, of the stepping motor (31) (hereinafter also simply referred to as a motor) can be controlled by controlling power (a pulse signal (S)) to be supplied. The controller (500) inputs the pulse signal (S) to a connector (C) in the motor (31). A feature of the controller (500) lies in control of the rotation speed of the motor (31). Specifically, the controller (500) controls the rotation speed of the motor (31) in accordance with a differential pressure ($\Delta P$) between the pressure in the space (the inner space (IS)) of the valve body (50) and the pressure in the outer space (OS).

Figure 14:
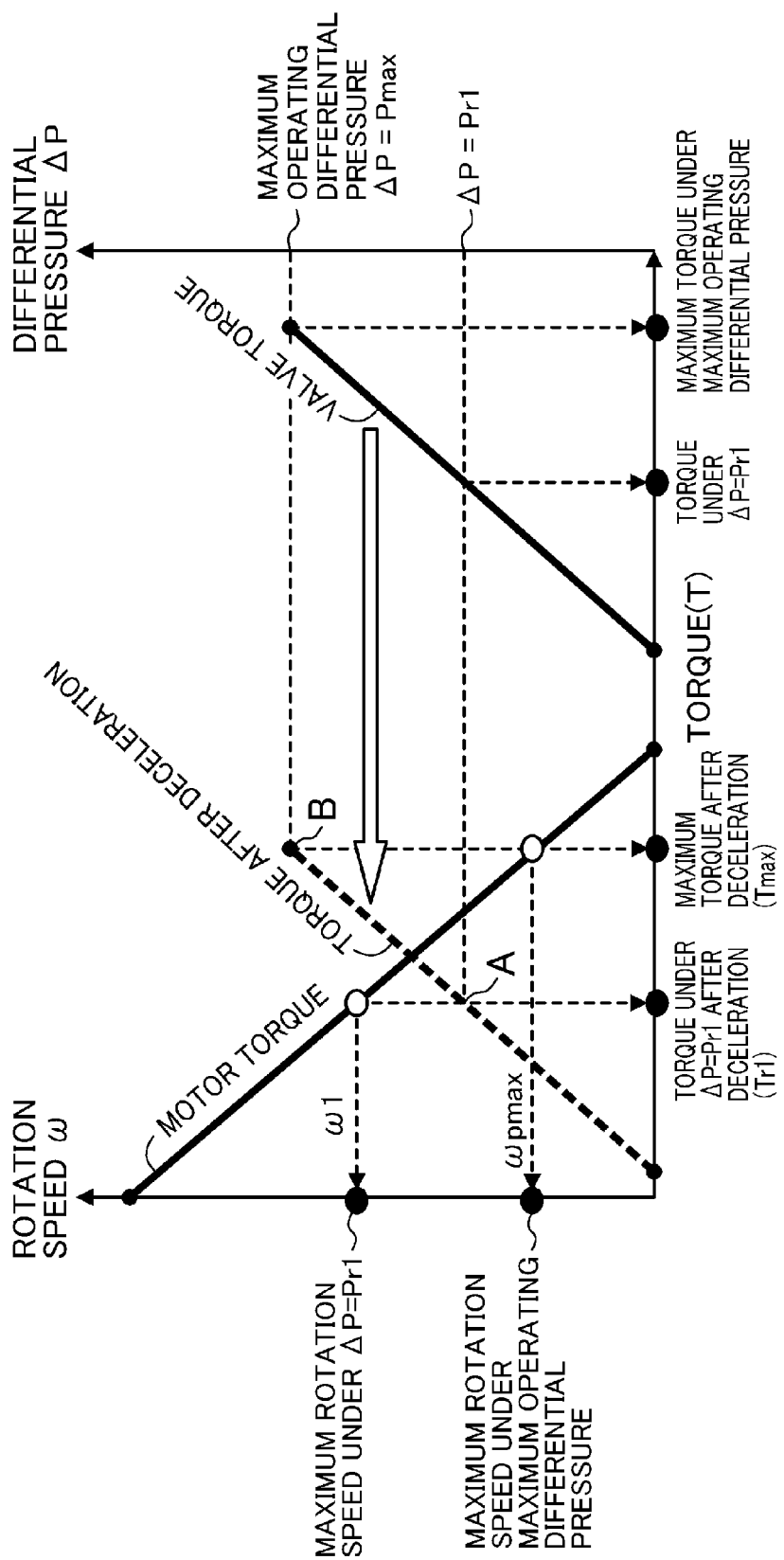
FIG. 14 is a graph showing a relationship between a rotation speed and a generated torque of a motor and a relationship between a differential pressure and a drive torque of a valve (a valve body).

FIG. 14 is a graph showing a relationship between a rotation speed and a generated torque of the motor (31) and a relationship between a differential pressure ($\Delta P$) and a drive torque of the valve (the valve body (50)). In FIG. 14, the horizontal axis represents the torque. In FIG. 14, the left vertical axis represents the rotation speed ($\omega$) of the motor (31), and the right vertical axis represents the differential pressure ($\Delta P$). The line indicated as "motor torque" shows a relationship between the rotation speed of the motor (31) and a torque generated by the motor (31). The line indicated as "valve torque" shows a torque necessary for driving the valve body (50) under application of a differential pressure ($\Delta P$). The line indicated as "torque after deceleration" shows a torque of the motor (31) necessary for generating a "valve torque" through a speed reducer (a variable-speed gear (32)).

As shown in FIG. 14, if the relationship of differential pressure ($\Delta P$) is equal to Pr1, i.e., $\Delta P = Pr1$, for example, a torque after deceleration (Tr1) is determined from an intersection (A) between the line of $\Delta P = Pr1$ and the line of "torque after deceleration," and thus, the rotation speed of the motor (31) that can generate the torque (Tr1) is $\omega 1$ or less. Similarly, if the differential pressure ($\Delta P$) is the maximum pressure (i.e., a highest actuation differential pressure (Pmax)) in the air conditioner, a torque after deceleration (Tmax) is determined from an intersection (B) between the line of $\Delta P = Pmax$ and the line of "torque after deceleration," and thus, the rotation speed of the motor (31) that can generate the torque (Tmax) is $\omega pmax$ or less.

The controller (500) stores table data or a function (hereinafter referred to as a function or the like) corresponding to the graph shown in FIG. 14. As illustrated in FIG. 9, for example, in the refrigerant circuit (61), each of the fourth suction pipe (101) and the first discharge pipe (72) includes a pressure sensor (501). The controller (500) controls the rotation speed ($\omega$) of the motor (31) by using a differential pressure ($\Delta P$) (a detected differential pressure) obtained based on the pressure detected by the pressure sensor (501) and the function or the like. Among the four change-over valves included in the combined valve (10), the uppermost valve in FIG. 2 (hereinafter also referred to as a main four-way valve) has the highest differential pressure ($\Delta P$). In view of this, in this embodiment, the speed of the motor (31) is controlled in accordance with the differential pressure ($\Delta P$) of the main four-way valve. The speed control of the motor (31) by the controller (500) will be described in detail later.

<Switching Operation in Combined Valve>

FIGS. 15A-15C are timing charts showing relationships among the differential pressure ($\Delta P$), the valve torque, and the rotation speed of the motor (31) in the combined valve (10) of the first embodiment. In each of FIGS. 15A-15C, the horizontal axis represents the time. In FIG. 15A, the differential pressure ($\Delta P$) is the difference between pressures detected by the two pressure sensors (501), and corresponds to the differential pressure between the pressure of the space (the outer space (OS)) of the first valve chamber (17a) and the pressure of the inner space (IS) in the main four-way valve (the first passage switch (20a)) of the combined valve (10). The differential pressure ($\Delta P$) varies depending on the elapsed time (the rotation angle of the valve body (50)), as illustrated in FIG. 15A.

In the combined valve (10), rotation of the valve body (50) allows one of the two ports that communicate with each other by means of the valve body (50) is connected to the space (OS) in the first valve chamber (17a) at time (t01), for example. From this time, the differential pressure ($\Delta P$) gradually decreases, and the pressures of the space (OS) and the inner space (IS) are equalized at time (t02). Further rotation of the valve body (50) terminates switching of the communication state between the ports at time (t03). Then, the differential pressure ($\Delta P$) gradually increases, and the steady state is established from time (t04).

In this manner, in a case where the differential pressure ($\Delta P$) varies, the "valve torque" also changes with time, as illustrated in FIG. 15B. In this example, the valve torque at the start of switching (time (t00) in FIGS. 15A-15C) is larger than that during the switching. In view of this, the controller (500) of this embodiment determines the rotation speed ($\omega$) of the motor (31) at the start of switching in accordance with the differential pressure ($\Delta P$).

Specifically, based on the differential pressure (ΔP) obtained at the start of switching, the controller (500) obtains the maximum rotation speed at the start of switching by using the function or the like. In this example, the controller (500) sets the rotation speed (ω) of the motor (31) at the maximum rotation speed. For example, as shown in FIG. 14, if the differential pressure (ΔP) is Pr1, i.e., ΔP=Pr1, the rotation speed (ω) at this time is set at ω1. Then, as illustrated in FIG. 15C, the controller (500) outputs a predetermined pulse signal (S) to the motor (31) such that the speed thereof is maintained until switching of the valve body (50) is completed. In this manner, in this embodiment, the rotation speed of the motor (31) is controlled in accordance with the differential pressure (ΔP) between the internal and external pressures of the valve body (50).

As indicated by the broken line in FIG. 15A, if the differential pressure (ΔP) is Pr2, which is lower than Pr1, the controller (500) obtains the maximum, rotation speed (ω2) at the start of switching in accordance with the differential pressure (Pr2) at this time by using the function or the like. The controller (500) sets the rotation speed (ω) of the motor (31) at the obtained value ω2. The controller (500) controls the motor (31) such that the rotation speed (ω2) thereof is maintained until switching of the valve body (50) is completed.

Advantages of First Embodiment

As described above, in this embodiment, the differential pressure (ΔP) is detected, and in accordance with the differential pressure (ΔP) at switching, the rotation speed of the motor (31) is determined, thereby enabling the rotation speed to be set at a higher speed. Thus, in the combined valve (10), the switching period can be reduced. In particular, in this embodiment, the presence of the back-pressure spaces (G1, G2) can reduce the sliding friction of the valve body (50), and also sets a higher rotation speed.

Since the rotation speed does not increase unnecessarily, the motor (31) does not loose synchronization under a high differential pressure (ΔP).

In addition, since an optimum rotation speed can be selected, the gear ratio of the variable-speed gear (32) can be reduced. Further, the size of the motor (31) can also be reduced. That is, this embodiment can achieve cost reduction.

Second Embodiment

An air conditioner according to a second embodiment is different from the first embodiment in the configuration of the controller (500). A controller (500) according to the second embodiment reduces the rotation speed (ω) of a motor (31) in accordance with an increase in differential pressure (ΔP) during switching operation of a valve body (50), and increases the rotation speed (ω) of the motor (31) in accordance with a decrease in differential pressure (ΔP).

<Switching Operation of Valve>

FIGS. 16A-16C are timing charts showing relationships among a differential pressure (ΔP), a valve torque, and a rotation speed of the motor (31) in a combined valve (10) of the second embodiment. In each of FIGS. 16A-16C, the horizontal axis also represents the time. In this embodiment, a controller (500) also determines the rotation speed (ω) of the motor (31) at a start of switching in accordance with the differential pressure (ΔP). Specifically, the controller (500) obtains a maximum rotation speed (ω1) at the start of switching by using the detected differential pressure (ΔP) and a function or the like described above, and sets the rotation speed (ω) of the motor (31) at a value ω1.

In the combined valve (10), as illustrated in FIG. 16A, even when a valve body (50) rotates, the differential pressure (ΔP) is constant for a certain period, and thus, the controller (500) controls the motor (31) such that the rotation speed of the motor (31) in this period is kept at the maximum rotation speed (ω1). When further rotation of the valve body (50) causes one of ports that communicate with each other by means of the valve body (50) to be connected to a space (OS), the differential pressure (ΔP) gradually decreases. In the example of FIGS. 16A-16C, the differential pressure (ΔP) starts decreasing at time (t01). In view of this, the controller (500) obtains the rotation speed of the motor (31) by using the function or the like in accordance with the decrease in differential pressure (ΔP), thereby controlling the motor (31) at this rotation speed. In this example, the controller (500) gradually increases the rotation speed of the motor (31) from time (t01) to time (t02) (see FIG. 16C).

When the pressures of an inner space (IS) and the space (OS) are equalized, the controller (500) controls the motor (31) such that the rotation speed at this time is maintained. When switching of the communication state is finished at time (t03), the differential pressure (ΔP) gradually increases, and a steady state is established at time (t04). In a period from time (t03) to time (t04), the controller (500) obtains the rotation speed of the motor (31) by using the detected differential pressure (ΔP) and the function or the like in accordance with the increase in differential pressure (ΔP), and controls the motor (31) to this rotation speed. In this example, the controller (500) gradually reduces the rotation speed of the motor (31) from time (t03) to time (t04) (see FIG. 16C). When the differential pressure (ΔP) reaches the steady state at time (t04), the controller (500) controls the motor (31) such that the rotation speed at this time is maintained, and the motor (31) rotates to move the valve body (50) to a predetermined position.

Advantages of Second Embodiment

As described above, in this embodiment, the differential pressure (ΔP) is detected during operation of the valve body (50), and the rotation speed of the motor (31) is controlled in accordance with a change in this differential pressure (ΔP). Thus, the rotation speed of the motor (31) can be increased when the differential pressure (ΔP) decreases in switching. Thus, switching can be performed at a higher speed than in the first embodiment.

Other Embodiments

<1> The rotation speed of the motor (31) at the start of switching described above is an example. The rotation speed of the motor (31) may be lower than the maximum rotation speed determined based on the differential pressure (ΔP), and may be appropriately adjusted in view of a margin necessary for a system and an intended switching period.

<2> The rotation speed may be calculated by using a substitute value for the differential pressure (ΔP). For example, the rotation speed of the motor (31) may be obtained based on the temperature difference between the high-pressure line and the low-pressure line in the refrigerant circuit (61). In this case, as the temperature difference increases, the rotation speed is reduced, whereas as the temperature difference decreases, the rotation speed is increased.

In addition, the rotation speed of the motor (31) for the combined valve (10) may be obtained based on the rotation speed of a compressor (the rotation speed of a compressor motor). In this case, as the rotation speed of the compressor motor increases, the rotation speed of the motor (31) for a combined valve is reduced, whereas as the rotation speed of the compressor motor decreases, the rotation speed of the motor (31) for the combined valve (10) is increased. In this manner, the phrase of "in accordance with the differential pressure (ΔP)" herein includes the case of using a substitute value for the differential pressure (ΔP) as well as the case of using the differential pressure (ΔP) itself.

<3> The speed control described above is not limited to a so-called four-stage compression refrigerant circuit such as the refrigerant circuit (61) as an example, and is applicable to a refrigerant circuit that performs compression with one or two compressors (i.e., a single-stage or two-stage compression refrigerant circuit), for example. That is, the foregoing technique is applicable irrespective of the number of stages (i.e., the number of valve bodies) of compressors. Of course, since the torque necessary for a motor increases with increasing number of change-over valves (valve bodies) driven by a single motor, the advantages of the present invention are enhanced as the number of the valve bodies (i.e., the number of stages) increases.

INDUSTRIAL APPLICABILITY

The present invention is useful for a refrigerant passage change-over valve that switches a passage of, for example, refrigerant in a refrigerant circuit and for an air conditioner using such a valve.

DESCRIPTION OF REFERENCE CHARACTERS 10 combined valve (refrigerant passage change-over valve)
11 valve case
17a, 17b, 17c, 17d valve chamber
31 stepping motor (motor)
40 drive shaft
50 valve body
61 refrigerant circuit
P1, P2, P3 . . . port
500 controller

The invention claimed is:

1. A refrigerant passage change-over valve configured to switch a refrigerant passage in a refrigerant circuit, the valve comprising:
 a valve case including a plurality of ports;
 a valve body configured to rotate in the valve case and slide on openings of predetermined ones of the ports to switch a communication state among the ports;
 a motor configured to rotate the valve body; and
 a controller configured to control a rotation speed of the motor in accordance with a differential pressure between internal and external pressures of the valve body, wherein
 the controller is configured to control the rotation speed of the motor such that a first non-zero rotation speed with a first differential pressure is larger than a second non-zero rotation speed with a second differential pressure higher than the first differential pressure, and
 the controller is configured to control the rotation speed of the motor to be constant at the first non-zero rotation speed or the second non-zero rotation speed during an entire switching operation of the valve body.

2. A refrigerant passage change-over valve configured to switch a refrigerant passage in a refrigerant circuit, the valve comprising:
 a valve case including a plurality of ports;
 a valve body configured to rotate in the valve case and slide on openings of predetermined ones of the ports to switch a communication state among the ports;
 a motor configured to rotate the valve body; and
 a controller configured to control a rotation speed of the motor in accordance with a differential pressure between internal and external pressures of the valve body, wherein
 the controller is configured to control the rotation speed of the motor such that a first non-zero rotation speed with a first differential pressure is larger than a second non-zero rotation speed with a second differential pressure higher than the first differential pressure, wherein
 the controller is configured to set the rotation speed to the first non-zero rotation speed or the second non-zero rotation speed for an entire switching operation at a start of switching of the valve body in accordance with the differential pressure.

3. The refrigerant passage change-over valve of claim 1, wherein
 the valve body comprises a plurality of valve bodies,
 the valve case is partitioned into a plurality of valve chambers each housing an associated one of the valve bodies, and
 the valve bodies are connected to a common drive shaft that is driven by the motor.

4. An air conditioner comprising a refrigerant circuit including the refrigerant passage change-over valve of claim 1 to perform a refrigeration cycle.

5. The refrigerant passage change-over valve of claim 2, wherein
 the controller is configured to control the rotation speed of the motor to be constant during the switching operation of the valve body.

6. The refrigerant passage change-over valve of claim 2, wherein
 the controller is configured to reduce the rotation speed in accordance with an increase in the differential pressure and to increase the rotation speed in accordance with a decrease in the differential pressure, during the switching operation of the valve body.

7. The refrigerant passage change-over valve of claim 2, wherein
 the valve body comprises a plurality of valve bodies,
 the valve case is partitioned into a plurality of valve chambers each housing an associated one of the valve bodies, and
 the valve bodies are connected to a common drive shaft that is driven by the motor.

8. An air conditioner comprising a refrigerant circuit including the refrigerant passage change-over valve of claim 2 to perform a refrigeration cycle.

* * * * *